United States Patent
Wentink et al.

(10) Patent No.: US 9,853,794 B2
(45) Date of Patent: Dec. 26, 2017

(54) ACKNOWLEDGEMENT (ACK) TYPE INDICATION AND DEFERRAL TIME DETERMINATION

(71) Applicant: QUALCOMM Incorporated, San Diego, CA (US)

(72) Inventors: Maarten Menzo Wentink, Naarden (NL); Alfred Asterjadhi, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 146 days.

(21) Appl. No.: 14/184,698

(22) Filed: Feb. 19, 2014

(65) Prior Publication Data

US 2014/0233478 A1 Aug. 21, 2014

Related U.S. Application Data

(60) Provisional application No. 61/866,991, filed on Aug. 16, 2013, provisional application No. 61/843,906, (Continued)

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1614* (2013.01); *H04L 1/1685* (2013.01);
(Continued)

(58) Field of Classification Search
CPC ..... H04L 1/1854; H04L 5/0055; H04L 1/188; H04W 74/008; H04W 74/08
See application file for complete search history.

(56) References Cited

U.S. PATENT DOCUMENTS 7,184,407 B1    2/2007 Myles et al.
7,940,688 B1 *  5/2011 Benveniste ........... 370/252
(Continued)

FOREIGN PATENT DOCUMENTS

EP        1571773 A2    9/2005
JP     2015525017 A    8/2015
(Continued)

OTHER PUBLICATIONS

"Draft Amendment to Standard [For] Information Technology—Telecommunications and Information Exchange Between Systems—LAN/MAN Specific Requirements—Part 11: Wireless Medium Access Control (MAC) and Physical Layer (PHY) Specifications: Medium Access Control (MAC) Quality of Service (QOS) Enhance", IEEE P802.11E/D6.0, Nov. 1, 2003 (Nov. 1, 2003). pages I-VIII,1, XP002570966, Retrieved from the Internet: URL:http://grouper.ieee.org/groups/802/11/ [retrieved on Mar. 2, 2010].
(Continued)

*Primary Examiner* — Jae Y Lee
*Assistant Examiner* — Aixa Guadalupe-Cruz
(74) *Attorney, Agent, or Firm* — Patterson & Sheridan, LLP

(57) ABSTRACT

Certain aspects of the present disclosure provide methods and apparatus for indicating a type of response for acknowledging a protocol data unit. One example method for wireless communications by a first apparatus generally includes transmitting a physical layer convergence protocol (PLCP) protocol data unit (PPDU) to a second apparatus and setting at least one bit in a PLCP header of the PPDU to indicate a type of response expected from the second apparatus responsive to the transmitted PPDU.

32 Claims, 22 Drawing Sheets

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| | | 1 | 0 | NDP ACK | SIFS+NDP+DIFS | VHT single MPDU ≥ 512 Bytes. Signals NDP ACK for VHT single MPDU. |
| | | | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| | | 1 | 0 | Not allowed | | VHT single MPDU ≥ 512 Bytes. Could signal Normal ACK for VHT single MPDU, but EIFS can not be determined due to confusion with Normal Block Ack. NDP ACK is the only response type supported for VHT single MPDU. |
| | | | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication < 3, such as an NDP ACK after the response PPDU. This EIFS is truncated by reception of another ACK indication field (as opposed to the EIFS for ACK indication < 3, which are never truncated). |

Related U.S. Application Data filed on Jul. 9, 2013, provisional application No. 61/844,008, filed on Jul. 9, 2013, provisional application No. 61/820,133, filed on May 6, 2013, provisional application No. 61/809,716, filed on Apr. 8, 2013, provisional application No. 61/805,402, filed on Mar. 26, 2013, provisional application No. 61/769,718, filed on Feb. 26, 2013, provisional application No. 61/767,240, filed on Feb. 20, 2013, provisional application No. 61/810,663, filed on Apr. 10, 2013.

(51) Int. Cl.
*H04L 1/18* (2006.01)
*H04W 28/04* (2009.01)
*H04W 84/12* (2009.01)

(52) U.S. Cl.
CPC ............ *H04L 1/188* (2013.01); *H04L 1/1854* (2013.01); *H04L 1/1896* (2013.01); *H04W 28/044* (2013.01); *H04W 84/12* (2013.01)

(56) References Cited

U.S. PATENT DOCUMENTS

| | | | |
|---|---|---|---|
| 2005/0165950 | A1 | 7/2005 | Takagi et al. |
| 2006/0007891 | A1 | 1/2006 | Aoki et al. |
| 2006/0176908 | A1 | 8/2006 | Kwon et al. |
| 2007/0147284 | A1 | 6/2007 | Sammour et al. |
| 2007/0171933 | A1 | 7/2007 | Sammour et al. |
| 2009/0252100 | A1 | 10/2009 | Sridhara et al. |
| 2009/0252145 | A1 | 10/2009 | Meylan et al. |
| 2010/0246600 | A1 | 9/2010 | Das et al. |
| 2011/0038332 | A1 | 2/2011 | Liu et al. |
| 2011/0222486 | A1 | 9/2011 | Hart et al. |
| 2011/0305176 | A1 | 12/2011 | Wentink |
| 2012/0113903 | A1 | 5/2012 | Kneckt et al. |
| 2012/0163354 | A1 | 6/2012 | Stacey et al. |
| 2013/0235773 | A1 | 9/2013 | Wang et al. |
| 2013/0301569 | A1* | 11/2013 | Wang et al. .................. 370/329 |
| 2014/0112230 | A1 | 4/2014 | Sammour et al. |
| 2014/0233551 | A1 | 8/2014 | Wentink et al. |

FOREIGN PATENT DOCUMENTS

| | | |
|---|---|---|
| WO | WO-2011159831 A1 | 12/2011 |
| WO | WO-2012064502 A1 | 5/2012 |
| WO | WO-2013170136 A1 | 11/2013 |

OTHER PUBLICATIONS

International Search Report and Written Opinion—PCT/US2014/017446—ISA/EPO—May 28, 2014.
Kuehnel T., "Proposed Normative Text for EDCA; 11-03-0502-00-000e-proposed-normative-text-for-edca-doc", IEEE Draft; 11-03-0502-00-000E-PROPOSED-NORMATIVE-TEXT NJ USA, vol. 802.11e, Jul. 21, 2003 (Jul. 21, 2003), pp. 1-8, XP017692186, [retrieved on Jul. 21, 2003] Section 9.10.1.5 Backoff procedure.
Liu Y., et al., (MARVELL): "Resolutions for mise CIDs ; 11-11-0604-01-00ac-resolutions-for-misc-ci ds", IEEE Draft; 11-11-0604-01-00AC-RESOLUTIONS-FOR-MISC-CI DS, IEEE-SA Mentor, Piscataway, NJ USA, vol. 802.11ac, No. 1, May 3, 2011 (May 3, 2011), pp. 1-8, XP017674724, [retrieved on May 3, 2011] p. 4 table 8.235.
Scarpa V., "Calibration Using Ndp; 11-07-0042-01-000n-calibration-using-ndp", IEEE Draft; 11-07-0042-01-000N-CALIBRATION-USING-NDP, IEEE-SA Mentor, Piscataway, NJ USA, vol. 802.11n, No. 1, Jan. 11, 2007 (Jan. 11, 2007), pp. 1-7, XP017685285, [retrieved on Jan. 11, 2007] slides 2, 6-7.
Alfred Asterjadhi (QUALCOMM): "Short BA; 11-12-0859-00-00ah-short-ba", IEEE SA MENTOR; 11-12-0859-00-00AH-SHORT-BA, IEEE-SA Mentor, Piscataway, NJ USA, vol. 802.11 ah, Jul. 16, 2012 (Jul. 16, 2012), pp. 1-11, XP068039407, [retrieved on Jul. 16, 2012].
Liu Y (Marvell): "Short-ack ; 11-12-0324-02-00ah-short-ack" IEEE Draft; 11-12-0324-02-00AH-SH0RT-ACK, IEEE-SA Mentor, Piscataway, NJ USA, vol. 802.11ah, No. 2, Mar. 14, 2012 (Mar. 14, 2012), pp. 1-15, XP017672405, [retrieved on Mar. 14, 2012].
Fischer M, "LB178 Proposed Resolutions AMPDU", IEEE P802.11 Wireless LANs, doc. IEEE P802. 11-11/1144r2, Aug. 29, 2011.
Liu Y., et al., "Early Ack Indication," IEEE802.11-12/0119r00, Jan. 2012, URL, https://mentor.ieee.org/802.11/dcn/12/11-12-0119-00-00ah-early-ack-indication.ppt.
Liu Y.,et al.,"Short Ack, Doc No. IEEE 802.11-12/0324r2", IEEE, Mar. 12, 2012, pp. 1-15.
Taiwan Search Report—TW103105898—TIPO—Apr. 20, 2016.

* cited by examiner

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| | | 1 | 0 | NDP ACK | SIFS+NDP+DIFS | VHT single MPDU ≥ 512 Bytes. Signals NDP ACK for VHT single MPDU. |
| | | | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| | | 1 | 0 | Not allowed | | VHT single MPDU ≥ 512 Bytes. Could signal Normal ACK for VHT single MPDU, but EIFS can not be determined due to confusion with Normal Block Ack. NDP ACK is the only response type supported for VHT single MPDU. |
| | | | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication < 3, such as an NDP ACK after the response PPDU. This EIFS is truncated by reception of another ACK indication field (as opposed to the EIFS for ACK indication < 3, which are never truncated). |

FIG. 4

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| | | 1 | 0 | NDP ACK | SIFS+NDP+DIFS | VHT single MPDU ≥ 512 Bytes. Signals NDP ACK for VHT single MPDU. |
| | | | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| | | 1 | 0 | Normal ACK + Post ACK EIFS | SIFS+BA+DIFS | VHT single MPDU ≥ 512 Bytes. Normal ACK response for VHT single MPDU, but with a Post ACK EIFS so that the time of resuming backoff is the same as at 3rd party receivers. |
| | | | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication < 3, such as an NDP ACK after the response PPDU. This EIFS is truncated by reception of another ACK indication field (as opposed to the EIFS for ACK indication < 3, which are never truncated). |

FIG. 5

| ACK indication in SIG | Response Type | Aggregation field in SIG | EOF of first MPDU delimiter with Length > 0 | Response | EIFS | Comments |
|---|---|---|---|---|---|---|
| 0 | No response | | | No response | 0 | Non-NDP Data, Management or Control frames that do not solicit a response. |
| 1 | NDP response | 0 | | NDP ACK | SIFS+NDP+DIFS | Single MPDU < 512 Bytes. The NDP ACK can also be an NDP CTS, but duration is the same. |
| | | 1 | 0 | NDP ACK | SIFS+NDP+DIFS | VHT single MPDU ≥ 512 Bytes. Signals NDP ACK for VHT single MPDU. |
| | | | 1 | NDP BA | SIFS+NDP+DIFS | A-MPDU with NDP Block Ack. |
| 2 | Normal Control response | 0 | | Normal ACK | SIFS+ACK+DIFS | Single MPDU < 512 Bytes. The ACK MCS is determined on the MCS signaled in the SIG (assuming mandatory MCSs as basic MCS set). The Normal ACK can also be a Normal CTS, but duration is the same. |
| | | 1 | 0 | Normal ACK @ 32 octets | SIFS+BA+DIFS | VHT single MPDU ≥ 512 Bytes. Normal ACK response for VHT single MPDU, but with an ACK that has 32 octet length – for example a modified Block Ack frame or an ACK frame in an A-MPDU that has zero-length delimiters to fill it up until 32 octets. |
| | | | 1 | Normal BA | SIFS+BA+DIFS | A-MPDU with normal Block Ack. BA MCS determined on the MCS signaled in the SIG (assuming mandatory MCSs as basic MCS set). |
| 3 | Long response | | | RDG | SIFS+Max PPDU+DIFS | Reverse Direction Grant. Must be followed up by a truncating transmission with ACK indication <3, such as an NDP ACK after the response PPDU. This EIFS is truncated by reception of another ACK indication field (as opposed to the EIFS for ACK indication <3, which are never truncated). |

FIG. 6

Dynamic EIFS Table

| Bandwidth [MHz] | Response Type | Response Rate MCS0/MCS4 | Existing EIFS [ms] | Dynamic EIFS [ms] |
|---|---|---|---|---|
| 1 | NDP ACK/BA | 0.15 | 2.104 | 0.984 |
| 1 | Normal ACK | 0.15/1.2 | 2.104 | 2.104/x |
| 1 | Normal BA | 0.15/1.2 | 2.104 | 2.664/x |
| 2 | NDP ACK/BA | 0.65 | 0.944 | 0.664 |
| 2 | Normal ACK | 0.65/3.9 | 0.944 | 0.944/x |
| 2 | Normal BA | 0.65/3.9 | 0.944 | 1.064/x |

FIG. 9

ACK Indication - Summary

| ACK Ind. | Response | Aggregation | EOF | Equivalent Ack Policy | Response Frame | Response Length |
|---|---|---|---|---|---|---|
| 0 | No Response | 0 | - | No Ack (10) | - | 0 |
| | | 1 | 0 | Block Ack (11) | - | |
| | | | 1 | No Ack (10) | - | |
| 1 | NDP | 0 | - | Normal Ack (00) | NDP ACK/CTS | NDP |
| | | 1 | 0 | Implicit BAR (00) | NDP BA | |
| | | | 1 | Normal Ack (00) | NDP ACK | |
| 2 | Normal | 0 | - | Normal Ack (00) | ACK/CTS | NDP + 14 Bytes |
| | | 1 | 0 | Implicit BAR (00) | BA | NDP + 32 Bytes |
| | | | 1 | Normal Ack (00) | TACK or 32 Byte (A-)MPDU | |
| 3 | Long | 0 | - | No Explicit Ack (01) | Speed Frame | Max PPDU |
| | | 1 | 0 | Block Ack (11) | Speed Frame with Block Ack policy | |
| | | | 1 | No Explicit Ack (01) | Speed Frame | |

FIG. 10

2 MHz SIG-A

|  | Short preamble | Long preamble | |
| --- | --- | --- | --- |
|  | SU | SU | MU |
| SU/MU Indication | - | 1 | 1 |
| Length / Duration | 9 | 9 | 9 |
| MCS | 4 | 4 | - |
| BW | 2 | 2 | 2 |
| Aggregation | 1 | 1 | - |
| STBC | 1 | 1 | 1 |
| Coding | 2 | 2 | 5 |
| SGI | 1 | 1 | 1 |
| GID | - | - | 6 |
| Nsts | 2 | 2 | 8 |
| PAID | 9 | 9 | - |
| Ack Indication | 2 | 2 | 2 |
| Smoothing | 1 | - | - |
| Beam-change Indication | - | 1 | - |
| NDP Indication | 1 | - | - |
| Doppler | 1 | 1 | 1 |
| Response MCS* | = | = | 2 |
| Reserved | 2 | 2 | 2 |
| CRC | 4 | 4 | 4 |
| Tail | 6 | 6 | 6 |
| Total | 48 | 48 | 48 |

*The response MCS field can be reserved for ACK indication ≠ 3 (Normal Response)

FIG. 11

2 MHz SIG-A

|  | Short preamble | Long preamble | |
| --- | --- | --- | --- |
|  | SU | SU | MU |
| SU/MU Indication | - | 1 | 1 |
| Length / Duration | 9 | 9 | 9 |
| MCS | 4 | 4 | - |
| BW | 2 | 2 | 2 |
| Aggregation | 1 | 1 | - |
| STBC | 1 | 1 | 1 |
| Coding | 2 | 2 | 5 |
| SGI | 1 | 1 | 1 |
| GID | - | - | 6 |
| Nsts | 2 | 2 | 8 |
| PAID | 9 | 9 | - |
| Ack Indication | 2 | 2 | 2 |
| Smoothing | 1 | - | - |
| Beam-change Indication | - | 1 | - |
| NDP Indication | 1 | - | - |
| Doppler | 1 | 1 | 1 |
| <u>Response MCS*</u> | <u>2</u> | <u>2</u> | <u>2</u> |
| ~~Reserved~~ | ~~2~~ | ~~2~~ | ~~2~~ |
| CRC | 4 | 4 | 4 |
| Tail | 6 | 6 | 6 |
| Total | 48 | 48 | 48 |

*The response MCS field can be reserved for ACK indication ≠ 3 (Normal Response)

FIG. 12

MU-MIMO Ack Indication

| ACK Indication in SIG-A | Response | EOF | Equivalent Ack Policy | Response Frame | Response Length |
|---|---|---|---|---|---|
| 0 | No Response | 0 | BA Policy | - | 0 |
| | | 1 | No Ack | | |
| 1 | NDP | 0 | Implicit BAR | NDP BA | NDP |
| | | 1 | Normal Ack | NDP ACK | |
| 2 | Normal | 0 | Implicit BAR | Normal BA | NDP + 32 Bytes |
| | | 1 | Normal Ack | TACK or 32 Byte (A-)MPDU | |
| 3 | Long | 0 | Implicit BAR | Any frame allowed by "Speed Frame" | Max PPDU |
| | | 1 | Normal Ack | | |

FIG. 13

Response BW For SIG-A
2 MHz SIG-A

|  | Short preamble | Long preamble | |
|---|---|---|---|
|  | SU | SU | MU |
| SU/MU Indication | - | 1 | 1 |
| Length / Duration | 9 | 9 | 9 |
| MCS | 4 | 4 | - |
| BW | 2 | 2 | 2 |
| Aggregation | 1 | 1 | - |
| STBC | 1 | 1 | 1 |
| Coding | 2 | 2 | 5 |
| SGI | 1 | 1 | 1 |
| GID | - | - | 6 |
| Nsts | 2 | 2 | 8 |
| PAID | 9 | 9 | - |
| Ack Indication | 2 | 2 | 2 |
| Smoothing | 1 | - | - |
| Beam-change Indication | - | 1 | - |
| NDP Indication | 1 | - | - |
| Doppler | 1 | 1 | 1 |
| Response BW Indicator* | <u>1</u> | <u>1</u> | <u>1</u> |
| ~~Reserved~~ | ~~2~~ | ~~2~~ | ~~2~~ |
| CRC | 4 | 4 | 4 |
| Tail | 6 | 6 | 6 |
| Total | 48 | 48 | 48 |

FIG. 14

Response BW Indicator

| Resp. BW Indi. (>=2MHz SU(MU) SIG-A) | Transmitter Side | Receiver Side | Third party STAs Side |
|---|---|---|---|
| 0 | aPHY-RX-START-Delay=606us | Responds with 1MHz PPDU | EIFS = aSIFSTime + DIFS + (1MHz PPDUTxTime) |
| 1 | aPHY-RX-START-Delay=286us | Responds with >=2MHz PPDU | EIFS = aSIFSTime + DIFS + (>=2MHz PPDUTxTime) |

FIG. 15

| Ack Policy field | Meaning |
|---|---|
| 0 | Normal Ack or Implicit Block Ack Request,<br><br>In a frame that is a non-A-MPDU frame or VHT single MPDU:<br>The addressed recipient returns an Ack frame after a short interframe space (SIFS) period, according to the procedures defined in 9.3.2.8 Ack procedure).<br><br>The ACK Indication field in the SIG field shall be set to NDP Response if the expected control response frame is an NDP ACK frame. Otherwise, the ACK Indication field shall be set to Normal Response.<br><br>In a frame that is part of an A-MPDU that is not a VHT single MPDU:<br>The addressed recipient returns a BlockAck frame, either individually or as part of an A-MPDU starting a SIFS after the PPDU carrying the frame, according to the procedures defined in 9.3.2.9 (Block Ack procedure), 9.22.7.5 (Generation and transmission of BlockAck frames by an HT STA), and 9.22.8.3 (Operation of HT-delayed Block Ack).<br><br>The ACK Indication field in the SIG field shall be set to NDP response if the expected control response frame is a NDP BlockAck frame. Otherwise, the ACK indication field shall be set to either Normal Response if a normal Block Ack frame is expected to be individually returned or shall be set to Long Response if the normal Block Ack frame is expected to be returned as part of an A-MPDU according to the procedures defined in 9.32i (Speed Frame Exchange).<br><br>ACK Policy 0 shall be limited to at most one MU recipient per MU PPDU. |
| 1 | No Ack or Block Ack Policy.<br><br>In a frame that is a non-A-MPDU frame or VHT single MPDU:<br>The addressed recipient takes no action upon receipt of the frame. More details are provided in 9.23 (No Acknowledgment (No Ack)). The Ack Policy subfield is set to this value in all individually addressed frames in which the sender does not require acknowledgment. The Ack Policy subfield is also set to this value in all group addressed short frames. This combination is not used for short Data frames with a TID for which a Block Ack agreement exists.<br><br>In a frame that is part of an A-MPDU frame that is not a VHT single MPDU:<br>The addressed recipient takes no action upon the receipt of the frame exect for recording the state. The recipient can expect a BlockAckReq frame in the future to which it responds using the procedure described in 9.22 (Block Acknowledgment (Block Ack)).<br><br>The ACK Indication field in the SIG field shall be set to No response if no response is expected by the recipient. The ACK Indication shall be set to Long Response if a non-control response is expected by the addressed recipient starting SIFS time after the receipt of the frame, according to the procedures defined in 9.32i (Speed Frame Exchange). |

FIG. 17

| NDP MAC Frame type | ACK INDICATION |
|---|---|
| NDP ACK | - No Response if Duration indication field value is 0 and Duration field value is 0<br>- Long Response if Duration indication field value is 1 and Duration field value is 0 |
| NDP BA | - No Response |
| NDP CTS | - No Response |
| NDP PS-Poll | - NDP Response |
| NDP Beamforming Report Poll | - No Response if ACK Indication field value is 00<br>- Long Response if ACK Indication field value is 11 |
| NDP Paging | - No Response |
| NDP Probe Request | - NDP Response |

FIG. 18

Setting the TXVECTOR's parameter RESPONSE_INDICATION

| RESPONSE_INDICATION | Solicited Immediate Response |
|---|---|
| No Response | The addressed recipient takes no immediate action upon receipt of the frame except for eventually recording its state.<br><br>The Ack Policy subfield (if any) in the QoS Control field or in the Frame Control field is set to No Ack or Block Ack. |
| NDP Response | The addressed recipient returns an individual NDP MAC frame:<br><br>• NDP ACK frame, as described in 9.3.2.8 (ACK procedure),<br>• NDP CTS frame, as described in 9.3.2.6 (CTS procedure),<br>• NDP BlockAck frame, as described in 9.21.7 (HT-immediate Block Ack extensions).<br><br>The Ack Policy subfield (if any) in the Qos Control field or in the Frame Control field is set to Normal Ack or Implicit Block Ack Request. |
| Normal Response | The addressed recipient returns an individual control response frame:<br><br>• ACK frame or QoS +CF-Ack frame, as described in 9.3.2.8 (ACK procedure) and 9.19.3.5 (HCCA transfer rules),<br>• CTS frame, as described in 9.3.2.6 (CTS procedure),<br>• BlockAck or BAT frame, as described in 9.3.2.9 (Block Ack procedure).<br>• TACK or STACK frame as described in 9.41 (Target Wake Time).<br><br>The Ack Policy subfield (if any) in the Qos Control field or in the Frame Control field is set to Normal Ack or Implicit Block Ack Request. |
| Long Response | The addressed recipient may return a response frame which is not an individual control response frame. More details are provided in 9.44 (Speed Frame Exchange), 9.26 (Reverse Direction Protocol), and 9.29.3 (Explicit feedback beamforming). |

FIG. 21

ACKNOWLEDGEMENT (ACK) TYPE INDICATION AND DEFERRAL TIME DETERMINATION

CLAIM OF PRIORITY UNDER 35 U.S.C. §119

This application claims benefit of U.S. Provisional Patent Application Ser. No. 61/767,240, filed Feb. 20, 2013, U.S. Provisional Patent Application Ser. No. 61/769,718, filed Feb. 26, 2013, U.S. Provisional Patent Application Ser. No. 61/805,402, filed Mar. 26, 2013, U.S. Provisional Patent Application Ser. No. 61/809,716, filed Apr. 8, 2013, U.S. Provisional Patent Application Ser. No. 61/810,663, filed Apr. 10, 2013, U.S. Provisional Patent Application Ser. No. 61/820,133, filed May 6, 2013, U.S. Provisional Patent Application Ser. No. 61/843,906, filed Jul. 9, 2013, U.S. Provisional Patent Application Ser. No. 61/844,008, filed Jul. 9, 2013, and U.S. Provisional Patent Application Ser. No. 61/866,991, filed Aug. 16, 2013, all of which are herein incorporated by reference in their entirety.

BACKGROUND

Field of the Invention

Certain aspects of the present disclosure generally relate to wireless communications and, more particularly, to indicating a type of response for acknowledging a protocol data unit.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Aspects of the present disclosure generally relate to indicating, within a protocol data unit, a type of response for acknowledging the transmitted protocol data unit.

Certain aspects of the present disclosure provide a first apparatus for wireless communications. The first apparatus generally includes a transmitter configured to transmit a physical layer convergence protocol (PLCP) protocol data unit (PPDU) to a second apparatus and a processing system configured to set at least one bit in a PLCP header of the PPDU to indicate a type of response expected from the second apparatus responsive to the transmitted PPDU.

Certain aspects of the present disclosure provide an apparatus for wireless communications. The apparatus generally includes a receiver configured to receive a PPDU and a processing system configured to determine a type of response to send for the PPDU based on at least one bit in a PLCP header of the PPDU.

Certain aspects of the present disclosure provide a method for wireless communications by a first apparatus. The method generally includes transmitting a PPDU to a second apparatus and setting at least one bit in a PLCP header of the PPDU to indicate a type of response expected from the second apparatus responsive to the transmitted PPDU.

Certain aspects of the present disclosure provide a method for wireless communications by an apparatus. The method generally includes receiving a PPDU and determining a type of response to send for the PPDU based on at least one bit in a PLCP header of the PPDU.

Certain aspects of the present disclosure provide a first apparatus for wireless communications. The first apparatus generally includes means for transmitting a PPDU to a second apparatus and means for setting at least one bit in a PLCP header of the PPDU to indicate a type of response expected from the second apparatus responsive to the transmitted PPDU.

Certain aspects of the present disclosure provide an apparatus for wireless communications. The apparatus generally includes means for receiving a PPDU and means for determining a type of response to send for the PPDU based on at least one bit in a PLCP header of the PPDU.

Certain aspects of the present disclosure provide a computer program product for wireless communications. The computer program product generally includes a computer-readable medium having instructions generally executable to transmit a PPDU to an apparatus and to set at least one bit in a PLCP header of the PPDU to indicate a type of response expected from the apparatus responsive to the transmitted PPDU.

Certain aspects of the present disclosure provide a computer program product for wireless communications. The computer program product generally includes a computer-readable medium having instructions executable to receive a PPDU at an apparatus and to determine a type of response to send for the PPDU based on at least one bit in a PLCP header of the PPDU.

Certain aspects of the present disclosure provide a first wireless station for wireless communications. The first wireless station generally includes at least one antenna; a transmitter configured to transmit, via the at least one antenna, a PPDU to a second wireless station; and a processing system configured to set at least one bit in a PLCP header of the PPDU to indicate a type of response expected from the second wireless station responsive to the transmitted PPDU.

Certain aspects of the present disclosure provide a wireless station for wireless communications. The wireless station generally includes at least one antenna, a receiver configured to receive a PPDU via the at least one antenna, and a processing system configured to determine a type of response to send for the PPDU based on at least one bit in a PLCP header of the PPDU.

Certain aspects of the present disclosure provide a first apparatus for wireless communications. The first apparatus generally includes a transmitter configured to transmit a media access control (MAC) protocol data unit (MPDU) to a second apparatus and a processing system configured to set at least one bit in a frame control field (FCF) in a MAC header of the MPDU to indicate a type of acknowledgement (ACK) expected from the second apparatus responsive to the transmitted MPDU.

Certain aspects of the present disclosure provide an apparatus for wireless communications. The apparatus generally includes a receiver configured to receive a MAC header FCF of an MPDU and a processing system configured to determine a type of ACK to send for the MPDU based on at least one bit in the FCF.

Certain aspects of the present disclosure provide a method for wireless communications by a first apparatus. The method generally includes transmitting an MPDU to a second apparatus and setting at least one bit in an FCF in a MAC header of the MPDU to indicate a type of ACK expected from the second apparatus responsive to the transmitted MPDU.

Certain aspects of the present disclosure provide a method for wireless communications. The method generally includes receiving a MAC header FCF of an MPDU and determining a type of ACK to send for the MPDU based on at least one bit in the FCF.

Certain aspects of the present disclosure provide a first apparatus for wireless communications. The first apparatus generally includes means for transmitting an MPDU to a second apparatus and means for setting at least one bit in an FCF in a MAC header of the MPDU to indicate a type of ACK expected from the second apparatus responsive to the transmitted MPDU.

Certain aspects of the present disclosure provide an apparatus for wireless communications. The apparatus generally includes means for receiving a MAC header FCF of an MPDU and means for determining a type of ACK to send for the MPDU based on at least one bit in the FCF.

Certain aspects of the present disclosure provide a computer program product for wireless communications. The computer program product generally includes a computer-readable medium having instructions executable to transmit an MPDU to an apparatus and to set at least one bit in an FCF in a MAC header of the MPDU to indicate a type of ACK expected from the apparatus responsive to the transmitted MPDU.

Certain aspects of the present disclosure provide a computer program product for wireless communications. The computer program product generally includes a computer-readable medium having instructions executable to receive a MAC header FCF of an MPDU and to determine a type of ACK to send for the MPDU based on at least one bit in the FCF.

Certain aspects of the present disclosure provide a first wireless station. The first wireless station generally includes at least one antenna, a transmitter configured to transmit an MPDU to a second wireless station via the at least one antenna, and a processing system configured to set at least one bit in an FCF in a MAC header of the MPDU to indicate a type of ACK expected from the second wireless station responsive to the transmitted MPDU.

Certain aspects of the present disclosure provide a wireless station. The wireless station generally includes at least one antenna, a receiver configured to receive a MAC header FCF of an MPDU via the at least one antenna, and a processing system configured to determine a type of ACK to send for the MPDU based on at least one bit in the FCF.

Certain aspects of the present disclosure provide an apparatus for wireless communications. The apparatus generally includes a receiver configured to receive a PPDU which is not intended for the apparatus and a processing system configured to determine a deferral time based on at least one bit in a PLCP header of the PPDU, wherein the at least one bit indicates a type of response to be sent by an intended recipient of the PPDU.

Certain aspects of the present disclosure provide a method for wireless communications by an apparatus. The method generally includes receiving a PPDU which is not intended for the apparatus and determining a deferral time based on at least one bit in a PLCP header of the PPDU, wherein the at least one bit indicates a type of response to be sent by an intended recipient of the PPDU.

Certain aspects of the present disclosure provide an apparatus for wireless communications. The apparatus generally includes means for receiving a PPDU which is not intended for the apparatus and means for determining a deferral time based on at least one bit in a PLCP header of the PPDU, wherein the at least one bit indicates a type of response to be sent by an intended recipient of the PPDU.

Certain aspects of the present disclosure provide a computer program product for wireless communications by an apparatus. The computer program product generally includes a computer-readable medium having instructions executable to receive a PPDU which is not intended for the apparatus to determine a deferral time based on at least one bit in a PLCP header of the PPDU, wherein the at least one bit indicates a type of response to be sent by an intended recipient of the PPDU.

Certain aspects of the present disclosure provide a wireless station. The wireless station generally includes at least one antenna, a receiver configured to receive, via the at least one antenna, a PPDU which is not intended for the wireless station; and a processing system configured to determine a deferral time based on at least one bit in a PLCP header of the PPDU, wherein the at least one bit indicates a type of response to be sent by an intended recipient of the PPDU.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4-6 illustrate example encodings of an acknowledgment (ACK) indication field, in accordance with certain aspects of the present disclosure.

FIG. 9 illustrates example Extended Interframe Space (EIFS) values for different response types and modulation and coding scheme (MCS) values, in accordance with certain aspects of the present disclosure.

FIG. 10 illustrates an example encoding of an ACK indication field, in accordance with certain aspects of the present disclosure.

FIGS. 11 and 12 illustrate possible ways for indicating an MCS to use for transmitting a response, in accordance with certain aspects of the present disclosure.

FIG. 13 illustrates an example encoding of an ACK Indication field for multi-user multiple input, multiple output (MU-MIMO), in accordance with certain aspects of the present disclosure.

FIGS. 14 and 15 illustrate an example use and format of a response bandwidth indicator, in accordance with certain aspects of the present disclosure.

FIG. 17 illustrates example interpretations of the ACK policy bit of FIG. 16, in accordance with certain aspects of the present disclosure.

FIG. 18 illustrates example equivalent ACK indications for null data packet (NDP) media access control (MAC) frames, in accordance with certain aspects of the present disclosure.

FIG. 21 is a table of example values for a RESPONSE_INDICATION parameter in a TXVECTOR to indicate a type of response, in accordance with certain aspects of the present disclosure.

DETAILED DESCRIPTION

Figure 1:
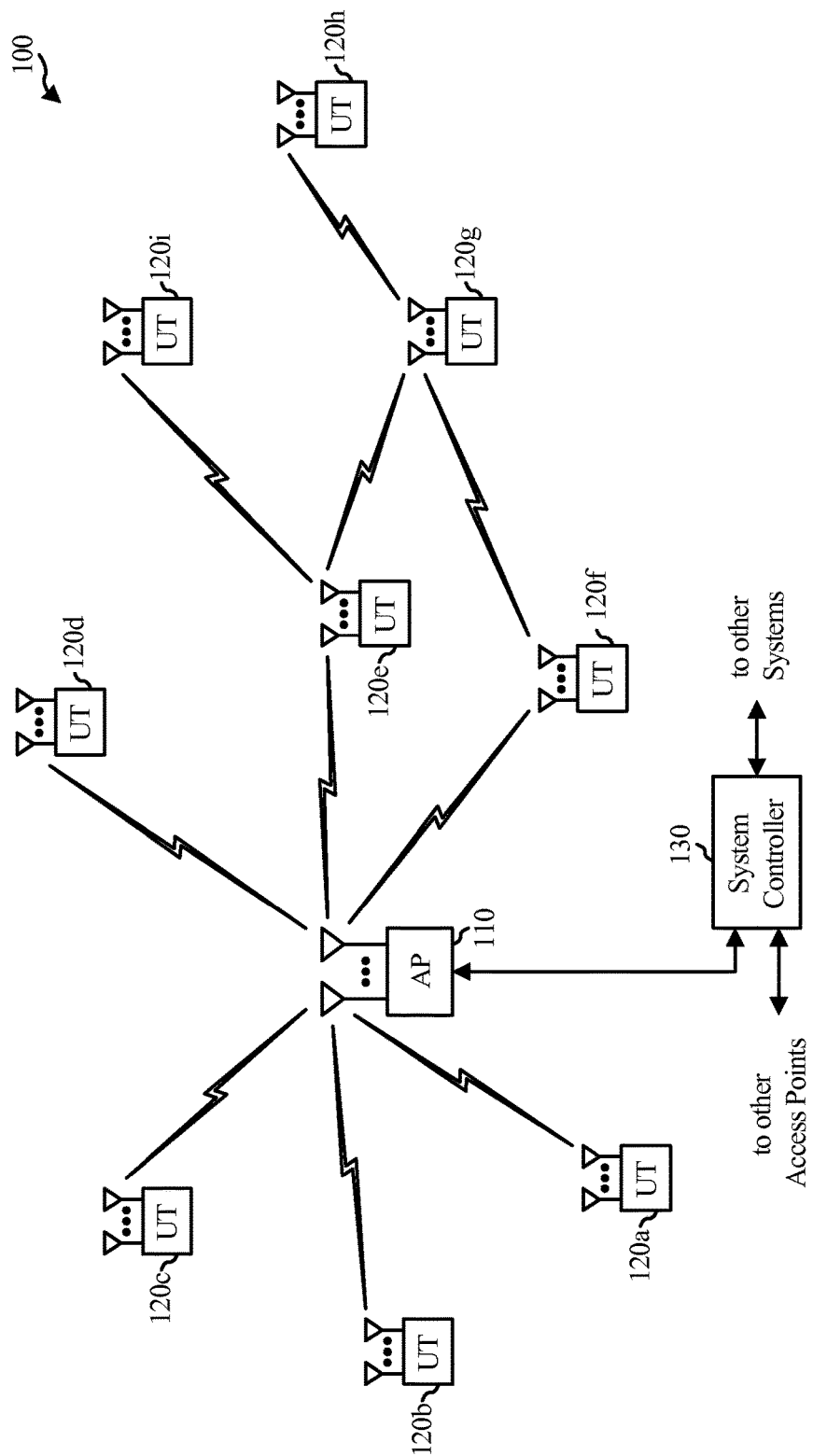
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The acronyms listed below may be used herein, consistent with commonly recognized usages in the field of wireless communications. Other acronyms may also be used herein, and if not defined in the list below, are defined where first appearing herein.

ACK . . . Acknowledgement
A-MPDU . . . Aggregated MAC Protocol Data Unit
AP . . . Access Point
BA . . . Block Ack
BAR . . . Block Ack Request
CRC . . . Cyclic Redundancy Check
DCF . . . Distributed Coordination Function
DIFS . . . DCF Interframe Space
EOF . . . End of Frame
EIFS . . . Extended Interframe Space
FCS . . . Frame Check Sequence
ID . . . Identifier
IEEE . . . Institute of Electrical and Electronic Engineers
LTF . . . Long Training Field
MAC . . . Media Access Control
MSB . . . Most Significant Bit
MIMO . . . Multiple Input Multiple Output
MPDU . . . MAC Protocol Data Unit
MU . . . Multi-User
MU-MIMO . . . Multi-User Multiple Input Multiple Output
NDP . . . Null Data Packet
OFDM . . . Orthogonal Frequency Division Multiplexing
OFDMA . . . Orthogonal Frequency Division Multiple Access
PHY . . . Physical Layer
PLCP . . . Physical Layer Convergence Protocol
PPDU . . . PLCP Protocol Data Unit
PSDU . . . PLCP Service Data Unit
QoS . . . Quality of Service
RDG . . . Reverse Direction Grant
S1G . . . Sub-1-GHz
SDMA . . . Spatial-Division Multiple Access
SIFS . . . Short Interframe Space
SIG . . . Signal
STA . . . Station
STBC . . . Space-Time Block Coding
STF . . . Short Training Field
SU . . . Single User
TCP . . . Transmission Control Protocol
VHT . . . Very High Throughput
WLAN . . . Wireless Local Area Network An Example Wireless Communication System The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such a wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to a different user terminal 120.

Figure 2:
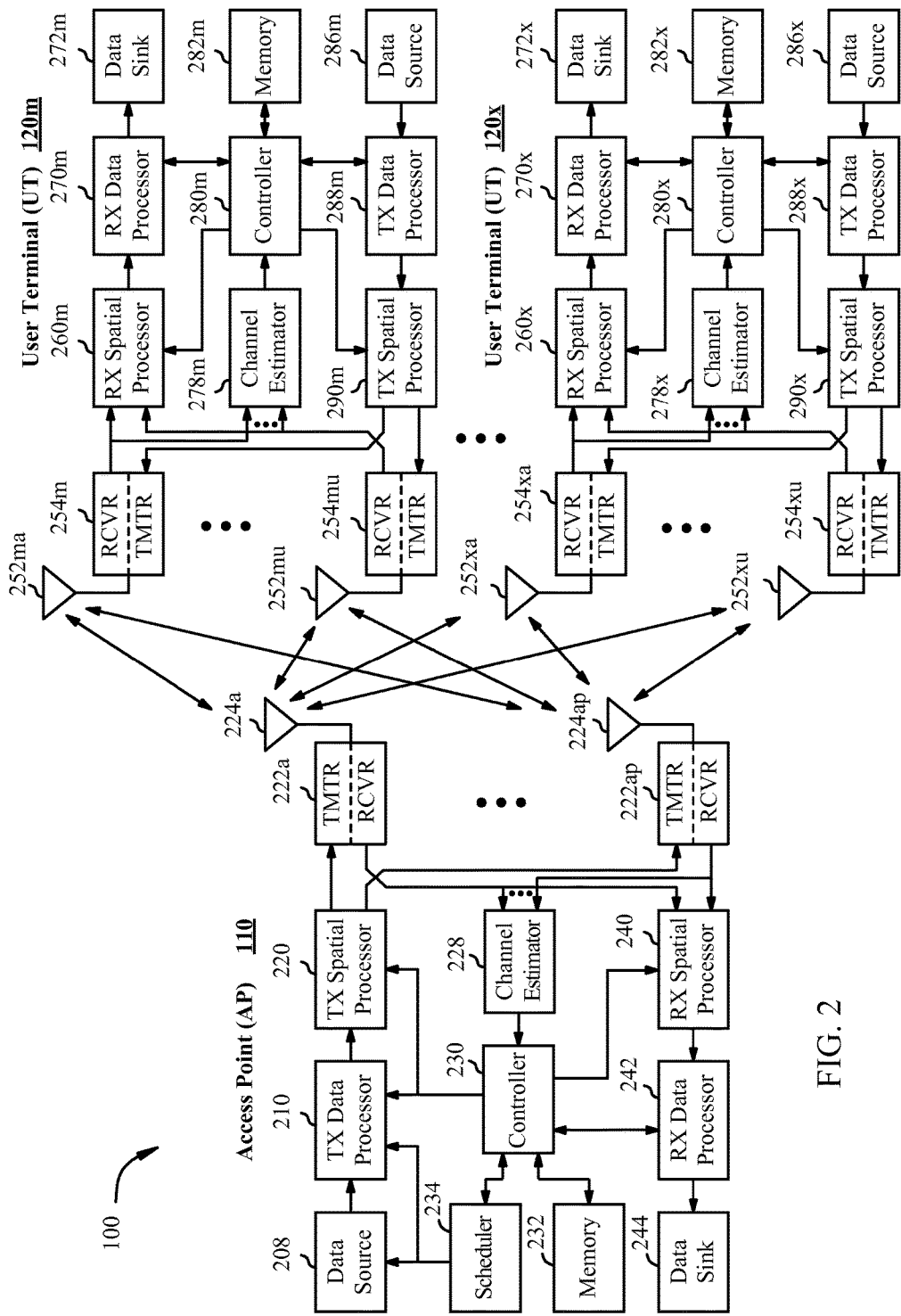
FIG. 2 is a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas.

Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
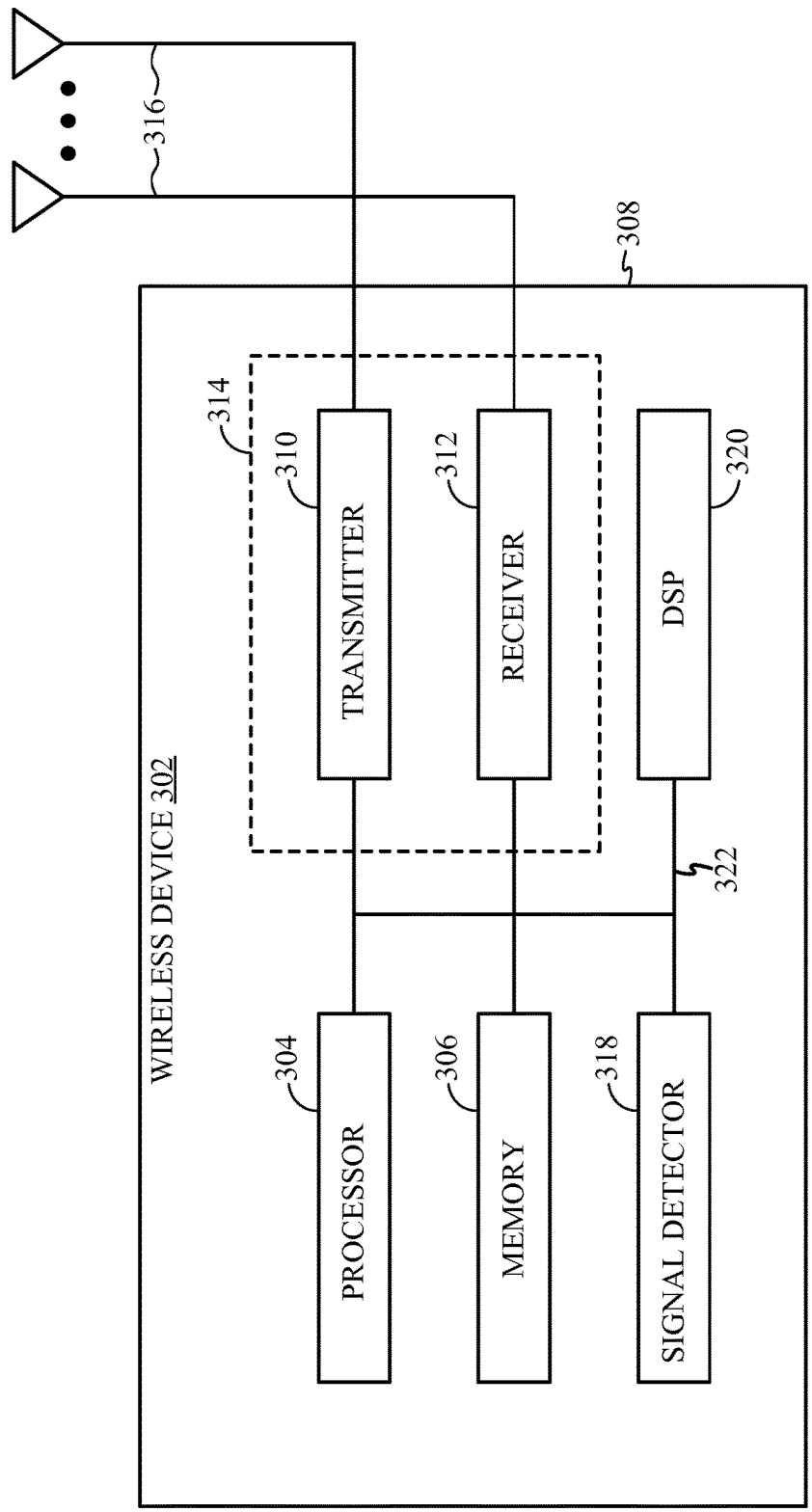
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example ACK Type Indication and EIFS

Also known as HEW (High Efficiency WiFi or High Efficiency WLAN) or Sub-1-GHz (S1G), IEEE 802.11ah is an amendment to the IEEE 802.11 standard that allows for longer range in 802.11 networks. The 802.11ah channels will be dedicated only for 802.11ah, which implies that there are no legacy 802.11 devices in these channels. This allows one to redesign the PLCP header (also known as a PHY header) and to address the issue that third party receivers of a PPDU currently do not know whether there will be a response to the PPDU.

Certain aspects of the present disclosure provide techniques and apparatus for transmitting a PPDU (e.g., an S1G PPDU) that includes an ACK Indication field (also referred to as a Response Indication field) in the PLCP header of the PPDU. The ACK Indication field may indicate the type of response (if any) to the PPDU. The type of response is used by third party receivers (which are receivers that are not the recipient of an MPDU in the PPDU or that cannot decode the MPDU(s) in the PPDU) to defer for a possible response to the PPDU. Deferral may be based on an extended interframe space (EIFS) time prior to resuming backoff. For certain aspects, the deferral may be based on a Response Indication Deferral (RID) procedure. An EIFS is started after the received PPDU if the MAC portion could not be decoded.

According to certain aspects, the ACK Indication field may be included in a SIGNAL (SIG) field of an S1G PPDU. As used herein, the term "SIG field" may also refer to a Signal A field (SIG-A field) and/or to a Signal B field (SIG-B field), for example, in a greater than or equal to 2 MHz long preamble. The ACK Indication field may be 2 bits in size, designating four possible response types (0-3). An exemplary encoding of the ACK Indication field is illustrated in FIG. 4.

The convention in S1G is that MPDUs <512 bytes are indicated through an octet count in the SIG field and that packets ≥512 octets are indicated by the number of symbols of the PPDU. In the latter case, A-MPDU is used in the MAC portion of the frame (which implies that the octet count of the MPDU(s) is indicated by an MPDU delimiter, and also that block acknowledgment (Block Ack) can be used). Whether to interpret the Length field as an octet count or a symbol count depends on the setting of the Aggregation bit. For certain aspects, Length, Aggregation, and ACK Indication are part of the SIG field of the PLCP header. The End of Frame (EOF) field is part of the MPDU delimiter. When the first non-zero length MPDU delimiter has an EOF value equal to 1, this signals that only a single MPDU is present in the PPDU and that the response shall be an ACK frame (Normal or NDP format, where an NDP typically consists of only a PLCP header, i.e., a true null data packet). Otherwise, the response to an A-MPDU is a Block Ack (Normal or NDP format). The normal Block Ack frame is generally a 32-byte-long compressed type that includes an MPDU header, a starting sequence number (SSN), and a 64-bit Block Ack bitmap.

Reverse Direct Grant (RDG) generally refers to a mechanism that is used to grant the receiver time to send a response frame other than an ACK or Block Ack. The ACK Indication is set to Long Response (ACK Indication=3) for RDG.

The exemplary ACK Indication field encoding illustrated in FIG. 4 provides an indication for no response, NDP response, normal (control) response, and long response. There is no indication for normal ACK in combination with Very High Throughput (VHT) single MPDU, because it is assumed that NDP ACK can be used in this case, instead of normal ACK. It is possible to add a normal ACK indication for VHT single MPDU, but this would entail a fifth response type, which implicates using 3 bits for the ACK Indication field. Only 2 bits are currently available, hence the design choice to omit the normal ACK option for VHT single MPDU.

It is possible that a normal ACK is sent as a response to a VHT single MPDU using an ACK Indication value of 2 (normal response), but both the sender and the receiver of the normal ACK may observe a Post ACK EIFS that is equal to the difference in transmission time between a Block Ack (BA) and an ACK:

Post ACK EIFS=BA transmit time−ACK transmit time

An exemplary encoding of the ACK Indication field that includes a Post ACK EIFS (for VHT single MPDU) is shown in FIG. 5.

Another solution is to send a Block Ack frame instead of an ACK frame, in which the SSN and the Block Ack bitmap are set to all 0s or some other reserved value. Yet another solution is to send the ACK as an A-MPDU that is filled to 32 octets using zero length delimiters (a 4-octet non-zero MPDU delimiter, a 14-octet ACK, 2 octets of A-MPDU padding, and 3 zero-length delimiters). FIG. 6 illustrates an exemplary encoding of an ACK Indication field with a 32-octet ACK for VHT single MPDU.

The Long Response type potentially causes a very long EIFS to be started at third party receivers. To avoid unfairness, a PPDU with an ACK indication of Long Response (=3) may be followed up with a PPDU with a different ACK indication (<3). This follow-up PPDU truncates the EIFS or RID at third party receivers and puts all contenders back on the same schedule to resume backoff.

In one embodiment, the initiator of the long response may truncate the EIFS by sending a transmission opportunity (TXOP) truncation frame as the last frame of the exchange. This TXOP truncation may be a contention free End (CF-End) frame or a CTS-to-Self (CTS addressed to itself) frame with duration field value set to 0. In one embodiment, the CF-End or CTS-To-Self frame may be a null data packet (NDP) where all the control information is included in the SIG field of the NDP frame. In one embodiment, an NDP CTS frame that acts as a TXOP truncation frame may substitute the CF-End in a normal network operation given that it may be shorter and sent at the lowest modulation and coding scheme (MCS) in comparison to a normal CF-End frame and, hence, more efficient. As an example, the NDP CTS frame may be used by the TXOP holder to reset the NAV of surrounding STAs when it does not have any more data to transmit, or to release the TXOP that may have been granted to its peer STA using RDG-like protocols, such as Speed Frame Exchange or Reverse Direction Protocols. In such an embodiment, if the peer STA does not access the medium after a certain amount of time (e.g., SIFS time), the TXOP holder may send an NDP CTS frame with duration set to 0 after a certain amount of time (e.g., point coordination function (PCF) interframe space (PIFS) time), to reset the NAV and free the medium.

In certain aspects, the techniques provided herein generally provide a mapping of ACK indication bits that allow a receiver selecting (and other STAs detecting) among multiple response frames (including NDP, normal control frames, and long frames) to a soliciting frame. The selection may be based on the ACK Indication field in the PHY preamble and, as described above, using other information available at the PHY preamble (e.g., the Aggregation bit), as well as some information at the MPDU delimiter (e.g., EOF). Certain aspects of the present disclosure also generally relate to the calculation of EIFS or RID based on this indication.

In some cases, a new ACK indication may not have an explicit value for the 'Block Ack' ACK Policy from the QoS Control field, but only an implicit one. This may help bits in the ACK Indication field. In some cases, the implicit indication of 'Block Ack' ACK Policy may be provided via the following settings:

ACK Indication=0 (No Response)
Aggregation=1 (A-MPDU)
First non-zero length MPDU delimiter has EOF=0 (i.e., no VHT single A-MPDU)

When these values are in the PPDU header and the first non-zero length MPDU delimiter, then the ACK Policy is equal to 'Block Ack', which means that state is recorded with respect to the received MPDUs (i.e., a Block Ack bitmap can be formed based on it), but no Block Ack frame is sent after the PPDU.

Including the ACK Indication field in the SIG field as described above provides an indication of the duration of null data packet (NDP) control response frames and normal control response frames, as well as Speed Frame exchange and asymmetric BA. It allows third party STAs to correctly predict the duration of the response, enabling dynamic EIFS calculation based only on PLCP header information. The intended receiver may then determine its ACK policy based on rules described herein for short MAC header or with the existing ACK policy field in the QoS Control field of a normal MAC header.

Figure 7:
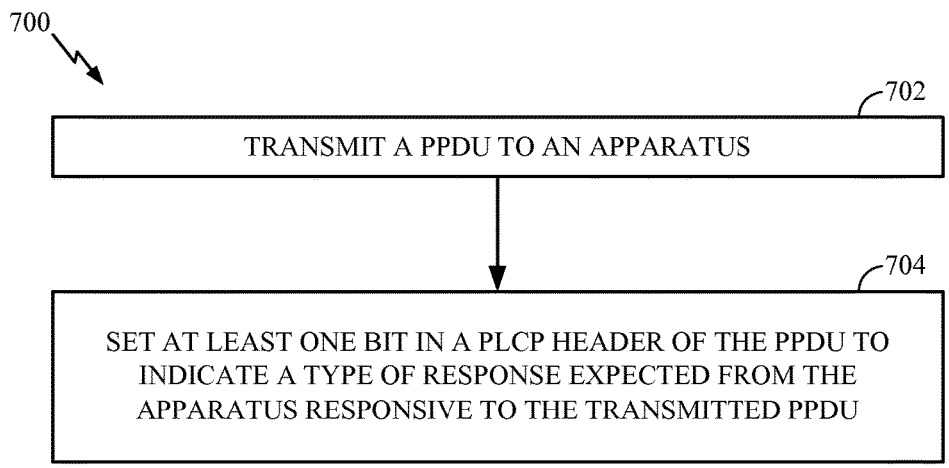
FIG. 7 is a flow diagram of example operations for wireless communications by an originator, in accordance with certain aspects of the present disclosure.

FIG. 7 is a flow diagram of example operations 700 for wireless communications by an originating (transmitting) apparatus, in accordance with certain aspects of the present disclosure. The operations 700 may begin, at 702, with the originating apparatus transmitting a PPDU to a receiving apparatus. At 704, before actual transmission at 702, the originating apparatus sets at least one bit in a PLCP header of the PPDU to indicate a type of response expected from the receiving apparatus responsive to the transmitted PPDU.

According to certain aspects, the at least one bit is in a first portion of the PLCP header that is decodable by the second apparatus and other apparatuses as well. For certain aspects, the first portion of the PLCP header includes a Signal (SIG) field if the PPDU is a 1 MHz PPDU or a Signal A (SIG-A) field if the PPDU is a greater than or equal to 2 MHz PPDU.

According to certain aspects, the operations 700 further include the originating apparatus selecting the indication (i.e., the type of response) from a group of types including at least one type that allows the response to be sent by the second apparatus in a null data packet (NDP).

According to certain aspects, the operations 700 further include the originating apparatus setting a bit in a Signal (SIG) field or a media access control (MAC) protocol data unit (MPDU) delimiter of the PPDU to a value that indicates the PPDU comprises a single MPDU.

According to certain aspects, the operations 700 further include the originating apparatus receiving an NDP block acknowledgement (BA) with a BA bitmap. In this case, the processing system may be configured to interpret one or more bits of the BA bitmap as an extension to an acknowledgement identification (ACK ID).

According to certain aspects, the at least one bit is set to a value that indicates no response is expected.

According to certain aspects, the at least one bit is at least two bits set to a value that indicates no response is expected, that a null data packet (NDP) response is expected, that a normal response is expected, or that a long response is expected. For certain aspects, the operations 700 further include the originating apparatus receiving a response to the PPDU and transmitting a second PPDU after receiving the response to the previously transmitted PPDU. For certain aspects, the operations 700 may further include the originating apparatus setting at least one bit in a PLCP header of the second PPDU to indicate that no response is expected from the second apparatus responsive to the transmitted second PPDU. For certain aspects, the operations 700 may further include transmitting a frame to truncate an EIFS, if the at least two bits are set to the value that indicates that the long response is expected. The frame may be a contention free End (CF-End) frame or a clear-to-send (CTS) frame. As indicated above, the frame may be a null data packet (NDP).

According to certain aspects, the operations 700 may further include the originating apparatus setting a bit in the PLCP header (e.g., in a SIG field) of the PPDU to a value that indicates whether the PPDU comprises an aggregated MAC protocol data unit (A-MPDU).

According to certain aspects, the operations 700 may further include the originating apparatus setting an End of Frame (EOF) value to zero of a first MPDU delimiter of the PPDU with a non-zero length field. This EOF value further indicates the type of response expected from the second apparatus responsive to the transmitted PPDU.

According to certain aspects, the operations 700 may further include the originating apparatus setting another bit in the PLCP header of the PPDU to a value that indicates the PPDU is transmitted as a multi-user multiple input multiple output (MU-MIMO) packet. In this case, the MU-MIMO packet may comprise different packets intended for users at different user positions, and the at least one bit in the PLCP header of the PPDU (the MU-MIMO packet) may indicate a type of response expected from only the second apparatus which corresponds to a user at a first user position with a non-zero number of space time streams (Nsts). For certain aspects, the first user position is based on a group identifier (GID). For certain aspects, the operations 700 may further include the originating apparatus including the GID in the PLCP header. For certain aspects, the MU-MIMO packet comprises different packets intended for users at different user positions, and the at least one bit in the PLCP header indicates a type of response expected from only the second apparatus which corresponds to a user at a first user position. In this case, the first apparatus may not expect a response from at least one of the users at a non-first user position or the users at a non-first user position with a non-zero number of space time streams (Nsts). For certain aspects, the operations 700 may further include separately indicating one or more types of responses expected from one or more users at other user positions.

According to certain aspects, the operations 700 may further include the originating apparatus setting at least one other bit in the PLCP header of the PPDU to indicate a bandwidth of the response expected from the second apparatus.

According to certain aspects, the operations 700 may further include the originating apparatus encoding or otherwise providing, in the PLCP header, a modulation and coding scheme (MCS) for the second apparatus to use for transmitting the response.

According to certain aspects, the operations 700 may further include transmitting a frame control field (FCF) having at least one ACK policy bit that, together with the at least one bit in the PLCP header, indicates the type of response expected from the second apparatus responsive to the transmitted PPDU. In this case, the at least one ACK policy bit may include at least one bit in a Type field of the FCF. For other aspects, the PPDU may include a Quality of Service (QoS) control field having at least one ACK policy bit that, along with the at least one bit in the PLCP header, indicates the type of response expected from the second apparatus responsive to the transmitted PPDU.

According to certain aspects, the PPDU further comprises at least one of: at least one ACK policy bit in a frame control field (FCF) or a Quality of Service (QoS) control field; or an End of Frame (EOF) field in a media access control (MAC) protocol data unit (MPDU) delimiter of the PPDU. In this case, the at least one of the ACK policy bit or the EOF field, together with the at least one bit in the PLCP header, indicates the type of response expected from the second apparatus. For certain aspects, a type of the eliciting PPDU indicates the type of response expected from the second apparatus.

According to certain aspects, the setting at 704 may include setting the at least one bit based on a parameter in a set of parameters received from a media access control (MAC) layer (or, more specifically, from a sublayer of the MAC layer). The set of parameters may be a TXVECTOR, and the parameter may be a response indication (e.g., RESPONSE INDICATION, also referred to as ACK_INDICATION).

According to certain aspects, the setting at 704 may include setting the at least one bit based on a set of parameters in a media access control (MAC) header of the PPDU.

According to certain aspects, if the originating apparatus did not receive a response to the PPDU after a point coordination function (PCF) interframe space (PIFS) time, the operations 700 may further involve transmitting a second PPDU to reset a Response Indication Deferral (RID) counter or a Network Allocation Vector (NAV) counter.

According to certain aspects, the operations further include negotiating, with the second apparatus, a bandwidth for the response.

Figure 8:
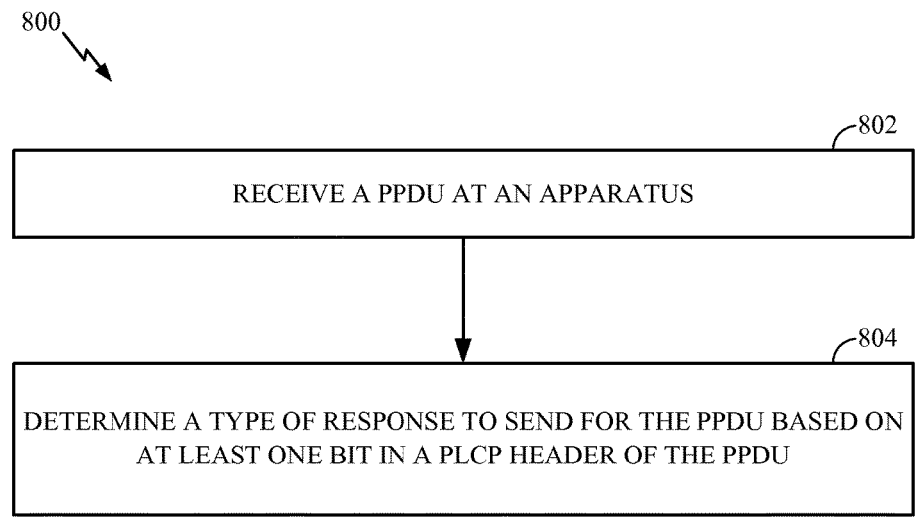
FIG. 8 is a flow diagram of example operations for wireless communications by a recipient, in accordance with certain aspects of the present disclosure.

FIG. 8 is a flow diagram of example operations 800 for wireless communications by a receiving apparatus, in accordance with certain aspects of the present disclosure. The operations 800 may begin, at 802, with the receiving apparatus receiving a PPDU. At 804, the receiving apparatus determines a type of response to send for the PPDU based on at least one bit in a PLCP header of the PPDU.

According to certain aspects, the type of response is selected from a group of types including at least one type that allows the response to be sent by the apparatus in a null data packet (NDP). In this case, the operations 800 may further involve the receiving apparatus transmitting the type of response in the NDP based on the determination.

According to certain aspects, the determined type of response is a null data packet (NDP) block acknowledgement (BA). In this case, the operations 800 may further include generating an extended acknowledgement identification (ACK ID), to be sent in the NDP BA, using use one or more bits of a BA bitmap.

According to certain aspects, determining the type of response at 804 may involve determining that the at least one bit is set to a value that indicates no response is to be sent.

According to certain aspects, the operations 800 may further include the receiving apparatus determining that a bit in the PLCP header (e.g., a SIG field) of the PPDU is set to a value that indicates the PPDU comprises an aggregated media access control (MAC) protocol data unit (A-MPDU) and transmitting a block acknowledgment (BA) in response to the PPDU based on the bit in the PLCP header (e.g., the SIG field). For certain aspects, the decision may be based on the EOF field in the MPDU delimiter.

According to certain aspects, the operations 800 further include the receiving apparatus determining that a bit in the PLCP header of the PPDU is set to a value that indicates the PPDU was transmitted as a multi-user multiple input multiple output (MU-MIMO) packet. In this case, the MU-MIMO packet may comprise different packets intended for users at different user positions. For certain aspects, the at least one bit in the PLCP header of the PPDU (the MU-MIMO packet) may indicate a type of response expected from only a single user at a first user position, the receiving apparatus may correspond to a user at a position other than the first user position, and/or the operations 800 may further include separately determining a type of response based on information other than the at least one bit in the PLCP header. For other aspects, the at least one bit in the PLCP header may indicate a type of response expected from only the apparatus which corresponds to a user at a first user position with a non-zero number of space time streams (Nsts).

According to certain aspects, the operations 800 may further include determining a bandwidth of the response based on at least one other bit in the PLCP header of the PPDU. In this case, the operations 800 may also include determining an EIFS based, at least in part, on the at least one other bit. For other aspects, the operations 800 may further include determining a bandwidth of the response based on an indicated capability (e.g., an S1G capabilities element indicating support for operating with the bandwidth).

According to certain aspects, the operations 800 may further involve determining, based on one or more other bits in the PLCP header, a modulation and coding scheme (MCS) to use for transmitting the response.

According to certain aspects, the operations 800 may further include the receiving apparatus determining that a first non-zero length MPDU delimiter has an End of Frame (EOF) value set to zero and transmitting a block acknowledgment (BA) in response to the PPDU based on the EOF value. If the at least one bit in the PLCP header indicates a null data packet (NDP) response, then the processing system may be configured to determine the type of response to send is an NDP BA. If the at least one bit in the PLCP header indicates a normal response, then the processing system may be configured to determine the type of response to send is a normal BA.

According to certain aspects, the operations 800 may further include the receiving apparatus determining that a first non-zero length MPDU delimiter has an End of Frame (EOF) value set to 1 and transmitting an acknowledgment (ACK) in response to the PPDU based on the EOF value. If the at least one bit in the PLCP header indicates a null data packet (NDP) response, then the processing system may be configured to determine the type of response to send is an NDP ACK. If the at least one bit in the PLCP header indicates a normal response, then the processing system is configured to determine the type of response to send is a normal ACK.

According to certain aspects, the operations 800 may further entail the receiving apparatus transmitting the determined type of response.

According to certain aspects, determining the type of response to send at 804 is based on at least one of an aggregation bit in the PLCP header, an End of Frame (EOF) value in at least one media access control (MAC) protocol data unit (MPDU) delimiter in the PPDU, or at least one ACK policy bit in a frame control field (FCF) or a Quality of Service (QoS) control field in the PPDU.

According to certain aspects, the at least one bit is set to a value that indicates a long response is to be sent. In this case, the operations 800 may further include determining an EIFS based on the long response and receiving a frame to truncate the EIFS. For certain aspects, the frame is a contention-free End (CF-End) frame or a clear-to-send (CTS) frame.

According to certain aspects, the operations 800 further involve receiving a frame control field (FCF) comprising at least one ACK policy bit, wherein the determining at 804 further includes determining the type of response to send based on the at least one ACK policy bit. For certain aspects, the at least one ACK policy bit includes at least one bit in a Type field of the FCF. For other aspects, the operations 800 further involve receiving a Quality of Service (QoS) control field comprising at least one ACK policy bit, wherein the determining at 804 further includes determining the type of response to send based on the at least one ACK policy bit According to certain aspects, the determining at 804 may further include determining the type of response to send based on a parameter in a set of parameters sent to a MAC layer (or more particularly, a MAC sublayer). The set of parameters may be based on the at least one bit in the PLCP header. For certain aspects, the set of parameters may be an RXVECTOR, and the parameter may be a response indication (e.g., RESPONSE_INDICATION). For certain aspects, the operations 800 may further include setting an RID counter based on the parameter.

As illustrated in FIG. 9, and noted above, devices detecting the packet format described above may be able to calculate EIFS based, at least in part, on the expected type of response indicated in the PLCP header. According to certain aspects, however, asymmetrical BA responses may be supported, where BAs are transmitted with different bandwidths and rates than the soliciting packet. As a result, EIFS may also be calculated based, at least in part, on the bandwidth of the response frame. As shown in the "Dynamic EIFS" column of FIG. 9, EIFS may vary significantly for different response types and different bandwidths. The ACK Indication allows all STAs to correctly calculate EIFS based on information available in the PLCP header of the received packet. The table in FIG. 9 is for transmissions with MCS0 at 1 MHz, MCS0 at 2 MHz, and MCS4 for both 1 and 2 MHz.

As illustrated in the ACK indication summary of FIG. 10, an ACK Indication=0 in the SIG field of the received frame indicates No Response, in which no immediate response is requested. An Aggregation bit=0 indicates a No Ack policy. An Aggregation bit=1 (or MU) with a first non-zero EOF=1 also indicates a No Ack policy, while a first non-zero EOF=0 indicates a Block Ack policy. With an ACK Indication=0 (No Response), third party receiving STAs may calculate EIFS=DIFS. This calculation may be based only on the value of the ACK indication, so the MAC header of the received frame need not be decoded.

An ACK Indication=1 in the SIG field of the received frame indicates an NDP Response. An Aggregation bit=0 indicates NDP ACK or NDP CTS. An Aggregation bit=1 (or MU) with a first non-zero EOF=1 indicates an NDP ACK, while a first non-zero EOF=0 indicates an NDP BA. In the NDP Response case, third party receiving STAs may calculate EIFS=aSIFSTime+DIFS+_NDPTxTime. This calculation may be based only on the value of the ACK indication.

An ACK Indication=2 in the SIG field of the received frame indicates a Normal Response. An Aggregation bit=0 indicates a 14-byte response (ACK or CTS). An Aggregation bit=1 (or MU) indicates a 32-byte response (BA, Block Acknowledgement TWT (BAT), or A-MPDU ACK, TWT Acknowledgment (TACK), where "TWT" stands for "target wake time"). A first non-zero EOF=1 indicates an A-MPDU padded ACK or TACK (also Short TWT Acknowledgement (STACK) to be A-MPDU padded to 32 bytes), while a first non-zero EOF=0 indicates BA or BAT. In the Normal Response case, third party receiving STAs may calculate EIFS depending on the Aggregation bit. With an Aggregation bit=0, EIFS=aSIFSTime+DIFS +_ACKTxTime, while with an aggregation bit=1, EIFS=aSIFSTime+DIFS +_BATxTime. The response MCS may be determined based on the PHY mandatory MCS set.

For a Long Response type (e.g., ACK Ind.=3), Aggregation=0 may be essentially equivalent to a "No Explicit Ack" policy, regardless of the EOF value, and a Speed Frame response type may be transmitted. Similarly, Aggregation=1 with EOF=1 may be essentially equivalent to a "No Explicit Ack" policy, and a Speed Frame response type may be transmitted. On the other hand, Aggregation=1 and EOF=0 may be essentially equivalent to a "Block Ack" policy, and a recipient may respond with a Speed Frame with the Block Ack Policy updated accordingly.

According to certain aspects, an ACK indication may be provided in a PLCP header for MU-MIMO packets. In such cases, an ACK indication, for example, in a SIG-A field of a MU-MIMO packet PLCP header may apply only to a single user. For example, the ACK indication in the SIG-A field may only apply to users with User_Position=0, while users with other positions (User_Position>0) may all have the ACK Indication=0. The Aggregation bit may always be set to 1 for MU-MIMO packets. FIG. 13 illustrates an example encoding for MU-MIMO ACK indication, showing the equivalent ACK policy, the expected response frame, and the response length based on EOF values.

In some cases, an MCS may not be present in a MU SIG-A field (e.g., it is in the SIG-B field), which may complicate the determination of the response MCS for MU packets specifying a normal response (e.g., ACK Indication=2). In such cases, an MCS to use for a response may be encoded in the PLCP header of the packet. For example, there are currently two reserved bits in the MU SIG-A field, which may be used to encode the response MCS (e.g., a 2-bit Response MCS field). These bits are also available in a SU SIG-A field, which may be used to make the response more deterministic. As an example, the Response MCS field may be reserved for ACK Indication≠2 (Normal Response) as follows:
  ACK Indication=0 (No Response)
  ACK Indication=1 (NDP Response)
  ACK Indication=3 (Long Response)
A possible encoding of such a Response MCS field (using the two reserved bits) may be:
  Response MCS=0: MCS0
  Response MCS=1: MCS2
  Response MCS=2: MCS4
  Response MCS=3: MCS6
FIGS. 11 and 12 further illustrate how such Response MCS field values may be incorporated into a 2 MHz SIG-A field using such (conventionally) reserved bits.

In some cases, one bit (any of the two that may be reserved) in the SU SIG-A field and/or MU SIG-A field may be used by the transmitter to indicate to the receiver, if the PLCP header of the responding frame can be of a lower bandwidth (BW) (e.g., referred to herein as a Response BW Indicator field, as shown in FIG. 14). For example, the transmitter of a 2 MHz PPDU may indicate by means of this bit (e.g., set to 1) that the receiver shall send a 1 MHz response frame. The type of response frame may depend on the ACK Indication field and/or the EOF field and other methods described herein. In this embodiment, third party STAs may use this information to correctly calculate EIFS values based on this additional indication in the SU (MU) SIG-A information. For example, based on the Response BW Indicator bit, third party stations can determine whether the responding frame can be a 1 MHz frame (and hence have a different PLCP header and MCS rate). In this embodiment, the EIFS calculation rules may take into account the type of PLCP header for calculating the EIFS depending on the ACK Indication field present in the SIG-A field. In another embodiment, the Response BW Indicator bit may be located in other fields (that have subfields with reserved values) of the PPDU.

As an example, the Response BW Indicator may be located in the Service field of the PPDU. In another embodiment, the one reserved bit in the Service field of the PPDU may be used to indicate to the intended receiver that the received frame is a relayed frame (i.e., one bit of the Service field of the received PPDU may be a Relayed Frame bit). This Relayed Frame bit may be used by a STA to indicate that, during a TXOP sharing procedure in a relay mode, the relay may either respond to the received frame with an ACK or whether the relay may directly forward the received PPDU to the next hop (e.g., the AP). Similarly, the Relayed Frame bit may also be used in the downlink (i.e., for transmissions from the AP to the STA through a relay). In this embodiment, the Relayed Frame bit may be set to 1 if the intended receiver (a relay STA) may forward it to the next hop STA (e.g., the AP) sharing the same TXOP initiated by the STA originating the PPDU. Otherwise the Relayed Frame bit may be set to 0 and indicate that the STA that generated the PPDU may expect an ACK from the receiver (i.e., the relay) prior to having the frame forwarded by the relay to the next hop (e.g., the AP).

As an example, an ACK indication set to 1 in a 2 MHz PPDU with a Response BW Indicator set to 1 (e.g., indicating a 1 MHz response PPDU) and EOF field set to 1 gives the following indications: (1) the receiving STA responds with a 1 MHz NDP ACK frame and (2) third party STAs calculate EIFS=aSIFStime+DIFS+NDPTxTime, where the NDPTxTime depends on the NDP type, which in this example is a 1 MHz NDP ACK that has a duration of 560 µs. If the Response BW Indicator would have been 0 (indicating for example a 2 MHz response PPDU), the receiver would have responded with an NDP ACK of duration 240 µs, and similarly, third party STAs would have taken into account this value (240 µs) to calculate the corresponding EIFS. In another embodiment, the one (or more) reserved bit(s) of the Service field may be used to indicate to the intended receiver of the PPDU additional control information (which would otherwise be included in the MAC header or the PLCP header of the PPDU) that may enable additional MAC or PHY features or functionality.

In one embodiment, based on the Response BW Indicator, the transmitter may determine its aPHY-RX-START-Delay parameter (which may be different for different types of PPDUs) based on the expected responding PPDU. As an example, as illustrated in FIG. 15, if the Response BW Indicator is set to indicate an expected PPDU of 1 MHz, then the aPHY-RX-START-Delay parameter may be set to around 600 µs (e.g., 606 µs), which is an appropriate value for 1 MHz PPDU responses such as 1 MHz ACK or NDP ACK frames. In another embodiment, the aPHY-RX-START-Delay parameter may be of a smaller value for 1 MHz NDP ACK frames (1 MHz NDP frames in general) with respect to their normal control response frames counterparts.

In another example, if the Response BW Indicator is set to indicate an expected PPDU of ≥2 MHz, then the aPHY-RX-START-Delay parameter may be set to about 280 µs (e.g., 286 µs) which is an appropriate value for ≥2 MHz PPDU responses, such as ACK or NDP ACK frames. In another embodiment, the aPHY-RX-START-Delay parameter may be of a smaller value for ≥2 MHz NDP ACK frames (≥2 MHz NDP frames in general) with respect to their normal control response frames counterparts.

In one embodiment, the transmitter and receiver may previously agree by means of negotiation or indicating the capability of operating in these settings (e.g., through association request/response or through management frames). For example, the bandwidth for the response may be based on an S1G Capabilities element.

In one embodiment, an ACK Policy field employing at least one bit may be added to the frame control field (FCF) of a MAC header. Such an ACK Policy field may have similar functionality to the EOF bit in the MPDU delimiter. As an example, an ACK Policy field of 1 bit in the FCF of the received frame may be set to 0 to indicate to the intended receiver that no acknowledgement is requested for the received frame. Similarly, a value of the ACK Policy field bit set to 1 may indicate that an acknowledgment is expected for the received frame. In general the ACK Policy field in the FCF may be used along with the ACK Indication field and Aggregation bit in the SIG field to indicate different ACK policies. As an example, if the Aggregation bit is set to 1 and the ACK policy of the FCF is set to 1, the receiver interprets the combination as a Block Ack policy. For example, the receiver may record the state of the received frame and may not send an acknowledgement in return if the ACK Indication field in the SIG field indicates "No response." Similar rules, as the ones described above, may apply to this new indication. As an additional example, if the ACK Indication field has a value indicating "NDP response," if the Aggregation bit is set to 1, and if the ACK policy bit is set to 1, the equivalent ACK policy to be followed by the intended receiver might be "implicit BAR," which may entail an NDP BA (or Normal BA if ACK indication specifies Normal Control Response frame) response, SIFS time after the eliciting frame (the received frame).

In some cases, there may also be an option that, for a VHT Single MPDU with ACK Indication set to NDP response, the recipient can send a BA with an "expanded ACK ID." For example, the recipient may expand a conventional ACK ID using BA Bitmap bits set to the partial FCS of the soliciting frame. This approach may effectively add additional Bitmap-size bits to the ACK ID (note that in this case there may be no duration or more data, etc.). According to certain aspects, one or more bits (e.g., a single bit in the MPDU delimiter) may be used to indicate the BA policy or no ACK policy (the reserved bit). According to certain aspects, as described above, one or more bits in the Frame Control field (FCF) of the soliciting frame may be used to indicate the ACK policy. According to certain aspects, one bit may be used to indicate an ACK policy. According to certain aspects, the ACK policy bit may be the LSB bit of the Type field of the Frame Control field, or the ACK policy bit may be located at the same position as the Type field of the Frame Control field. In this latter case, the Type field may be reduced by 1 bit (e.g., from 4 to 3 bits) to free one bit that can be used to indicate the ACK policy for the frame.

Figure 16:
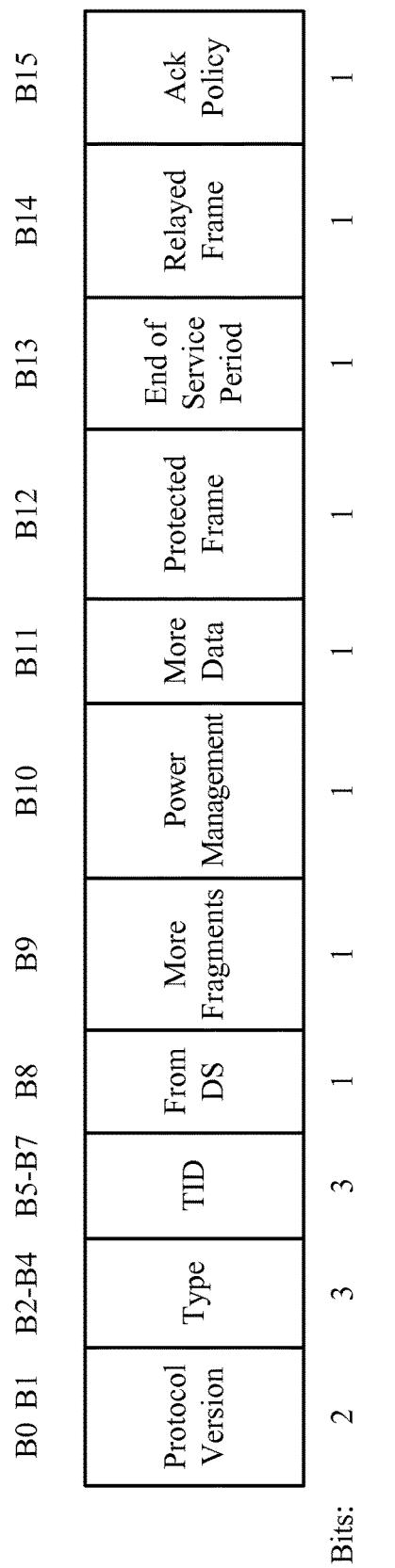
FIG. 16 illustrates an example frame control field (FCF) having an ACK policy bit, in accordance with certain aspects of the present disclosure.

In some cases, an ACK policy bit in an FCF may function separately from (or in conjunction with) an ACK indication provided via bits in the SIG field. The ACK policy bit may identify the acknowledgement policy that is followed upon the delivery of an MPDU. An ACK policy bit (or set of bits) may generally be located anywhere in an FCF. FIG. 16 illustrates one example format of an FCF where the ACK policy bit is the last bit in the FCF. The table in FIG. 17 indicates how such an ACK policy bit may be interpreted.

In some embodiments, the type of response is determined based on the Ack policy field in the QoS Control field and/or Frame Control field of the eliciting PPDU while the frame format of the response may be determined based on the RESPONSE_INDICATION (also referred to as the ACK_INDICATION) TXVECTOR parameter. In other words, the Ack Policy field determines the Ack Policy indicated by the transmitter, and the RESPONSE_INDICATION determines the type of response (normal ACK frame rather than NDP ACK frame, etc.).

For certain aspects, a PPDU may be sent to multiple receivers, using Multi-User MIMO (MU-MIMO). In this case, the initial part of the PLCP header is omni-directional and specifies a Group Identifier (Group ID) which identifies which group of STAs are addressed as part of the MU PPDU and a number of space time streams (Nsts) for each receiver. The STAs in the group have an order that is referred to as the user position. The user position determines which Nsts value in the Nsts field of the omni-directional portion of the PLCP header is adhered to. Nsts for a specific user can be 0, which means that the MU PPDU will not contain a PPDU destined for that user in the group. For an MU PPDU, the ACK Indication in the PLCP header applies to the first user with non-zero Nsts. The other users with non-zero Nsts implicitly have a No Response ACK Indication.

In some cases, a PPDU that is sent to multiple receivers using MU-MIMO may include a 2-bit ACK policy for each of the users, in the SIG-B fields of the PLCP header specifying a per-user ACK policy, with an encoding of the ACK policy field similar or same as to the ACK policy subfield located in the QoS Control field of a normal IEEE 802.11 MAC header, e.g., one combination for each No Ack, BA policy, Normal ACK or Implicit Block Ack Request (BAR), no explicit acknowledgement or PSMP Ack, and Block Ack.

FIG. 13 illustrates an example mapping of bits for ACK indication provided in a SIG-A field for MU-MIMO. In general for MU-MIMO, each user may have an indication of the ACK policy, so only one user (referred to herein as the primary user) can respond while the others refrain. Only this primary user may inherit the ACK policy indicated in the SIG-A field.

There are various options to indicate which user is the primary user. One option is to have the user in position 0 be the primary user, as noted above. Another option is to use a single ("primary user") bit in the SIG-B field to indicate the primary user. For example, the primary user bit may be set to 1 in the SIG-B field of the primary user, while the primary user bits of other users are set to 0. As noted above, the primary user is the only one that may inherit the ACK policy from the SIG-A field. All other users may have ACK Indication=0 (i.e., no response).

Figure 19:
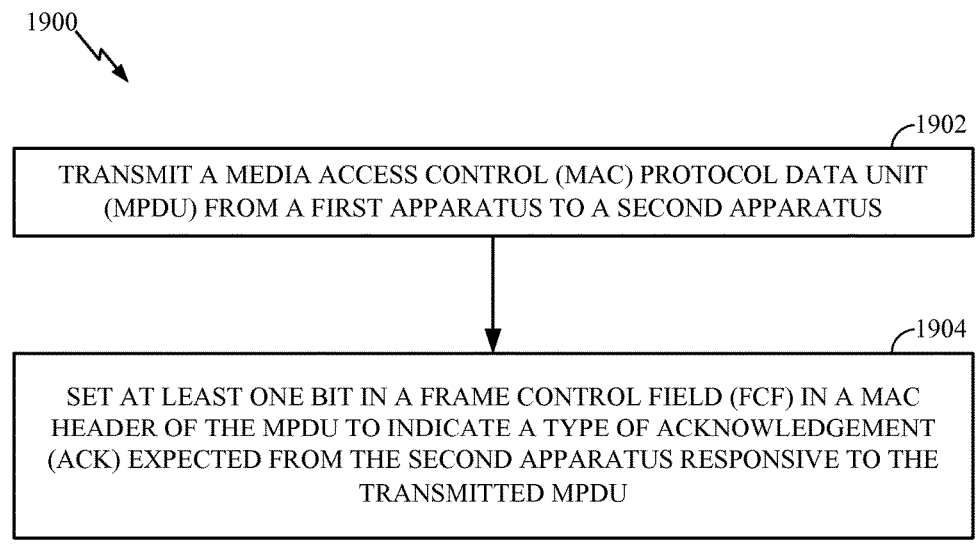
FIG. 19 is a flow diagram of example operations for wireless communications by an originator, in accordance with certain aspects of the present disclosure.

FIG. 19 is a flow diagram of example operations 1900 for wireless communications, according to certain aspects of the present disclosure. The operations 1900 may be performed by a first apparatus, such as a transmitting station (e.g., an AP). The operations may begin, at 1902, with the first apparatus transmitting a media access control (MAC) protocol data unit (MPDU) to a second apparatus (e.g., a STA). At 1904, the first apparatus may set at least one bit in a frame control field (FCF) in a MAC header of the MPDU to indicate a type of acknowledgement (ACK) expected from the second apparatus responsive to the transmitted MPDU.

According to certain aspects, the at least one bit in the FCF indicates whether a normal ACK or a block ACK is expected from the second apparatus responsive to the transmitted MPDU. For certain aspects, the operations 1900 may further involve the first apparatus setting at least one bit in a PLCP header of a PPDU (that includes the MPDU) to indicate a type of ACK expected from the second apparatus responsive to the transmitted MPDU. In this case, the at least one bit in the PLCP header may include at least two bits set to a value that indicates at least one of the following: (1) no response is expected, (2) that an NDP response is expected, (3) that a normal response is expected, or (4) that a long response is expected.

Figure 20:
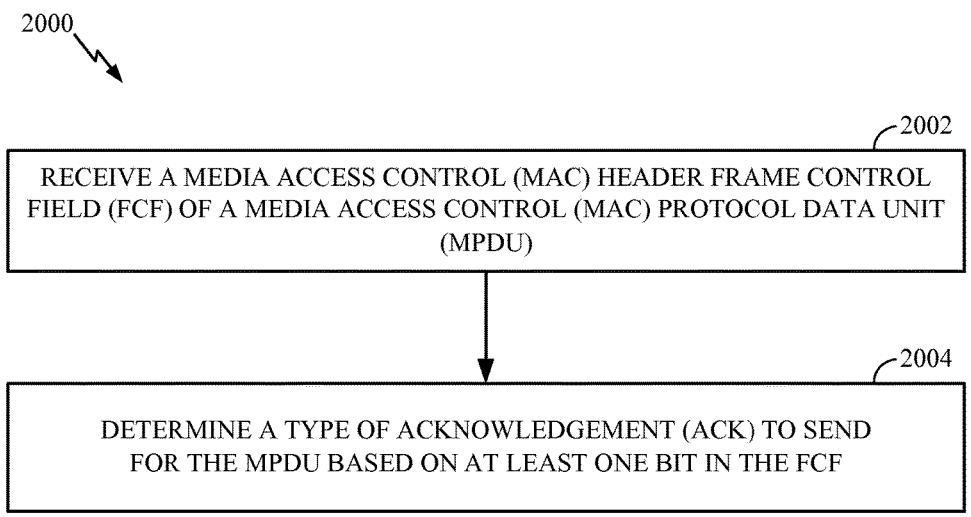
FIG. 20 is a flow diagram of example operations for wireless communications by a recipient, in accordance with certain aspects of the present disclosure.

FIG. 20 is a flow diagram of example operations 2000 for wireless communications, according to certain aspects of the present disclosure. The operations 2000 may be performed by a receiving apparatus (e.g., a STA). The operations 2000 may begin, at 2002, with the apparatus receiving an FCF in a MAC header of an MPDU. At 2004, the apparatus may determine a type of ACK to send for the MPDU based on at least one bit in the FCF. According to certain aspects, the operations 2000 may further include the apparatus transmitting the type of ACK based on the determination at 2004.

According to certain aspects, the at least one bit in the FCF indicates whether a normal ACK or a block ACK is to be sent. For certain aspects, the determining at 2004 may involve determining the type of ACK to send based on at least one bit in a PLCP header of a PPDU (that includes the MPDU). In this case, the at least one bit in the PLCP header may include at least two bits set to a value that indicates one of the following: (1) no response is to be sent, (2) that an NDP response is to be sent, (3) that a normal response is to be sent, or (4) that a long response is to be sent.

While the description above is focused on the calculation of EIFS values, those skilled in the art may appreciate that the rules presented herein may apply or assist third party stations (STAs) that follow different deferral mechanisms, such as Network Allocation Vector (NAV) or Response Indication Deferral (RID). According to certain aspects, RID may be determined in a similar (or the exact same) manner as described herein for EIFS. This may effectively provide a deferral mechanism based on a PLCP header, as well as a different mechanism based on a frame check sequence (FCS) fail.

In some cases, a device may wish to determine what type of ACK is indicated based on a type of NDP MAC frame. Example indications are shown in FIG. 18. In addition to those indications shown, a combination of those shown may be supported (e.g., for NDP clear-to-send (CTS) or NDP power save (PS)-Poll).

The RID may be considered a virtual Carrier Sense (CS) mechanism applicable to S1G STAs. A mechanism for setting and resetting the RID is described below. For non-S1G STAs, a CS mechanism may combine the NAV state and the STA's transmitter status with physical CS to determine the busy/idle state of the medium. For S1G STAs, the CS mechanism combines the NAV state, RID state, and the STA's transmitter status with physical CS to determine the busy/idle state of the medium. The NAV and RID may be thought of as counters, which count down to 0 at a uniform rate. For non-S1G STAs, when the NAV counter is 0, the virtual CS indication is that the medium is idle; when nonzero, the indication is busy. For S1G STAs, when both NAV and RID counters are 0, the virtual CS indication is that the medium is idle; when any of them is nonzero the indication is busy. The medium may most likely be determined to be busy when the STA is transmitting.

In order to set and reset the RID for S1G STAs, the RID counter may most likely be set to 0 every time that a PHY-RXSTART.indication primitive is received. An S1G STA that receives a frame for which the PHY-RXEND.indication primitive did not contain an error (or provides RXVECTOR parameters) may most likely update its RID counter based on the values of the RXVECTOR parameters' PREAMBLE_TYPE, RESPONSE_INDICATION, AGGREGATION, MCS, and CH_BANDWIDTH of the received frame as described in IEEE 802.11ah. For certain aspects, the S1G STA may not update its RID counter if the S1G STA is the intended receiver of any of the frames within the received PSDU or if the current PPDU includes at least one MPDU with a valid Duration field. The RID counter may most likely be updated at the moment the PHY-RXEND.indication primitive is issued for the current PPDU.

If the value of the RESPONSE_INDICATION is Long Response, the RID counter may be set to MaxPPDUTxTime+aSIFSTime, where MaxPPDUTxTime is the maximum duration of a S1G PPDU in microseconds as defined in IEEE 802.11ah. If the value of the RESPONSE_INDICATION is Normal Response, the RID counter may be set to NormalTxTime+aSIFSTime, where NormalTxTime is calculated based on the RXVECTOR parameters PREAMBLE_TYPE, AGGREGATION, MCS, and CH_BANDWIDTH in accordance with IEEE 802.11ah. If the value of the RESPONSE_INDICATION is NDP Response, the RID counter may be set to NDPTxTime+aSIFSTime, where NDPTxTime is calculated based on the RXVECTOR parameters PREAMBLE_TYPE and is equal to the time in microseconds for transmitting either a 1 MHz NDP MAC frame if PREAMBLE_TYPE is a 1 MHz preamble or a >=2 MHz NDP MAC frame if PREAMBLE_TYPE is a >=2 MHz short/long preamble. If the value of the RESPONSE_INDICATION is No Response, the RID counter may be set to 0.

If the received PPDU is an NDP MAC frame, the S1G STA may most likely set the RID counter by using the RESPONSE_INDICATION values per type of NDP MAC frame as described in the table of FIG. 18, illustrating an equivalent RESPONSE_INDICATION. NDP MAC frames, that include a Duration field which sets the NAV, may have an Equivalent RESPONSE_INDICATION of No Response in order to reset the RID counter since such frames set the NAV anyway.

As noted above, in some cases, the techniques described herein may be applied to various deferral mechanisms, such as Network Allocation Vector (NAV), EIFS, or Response Indication Deferral (RID). In order to set the counters of any of these mechanisms, the STA may signal the new counter values to the other STAs. As an example for the case of RID, a STA may distribute RID information in order to protect the response frame that is expected SIFS time after the frame that elicits that response. In order to do so, according to certain aspects of the present disclosure, the STA may set one or more bits according to a RESPONSE_INDICATION (also referred to as an ACK_INDICATION) parameter in a set of parameters (e.g., a TXVECTOR parameter) received from the MAC sublayer for each PPDU. FIG. 21 illustrates example values for the RESPONSE_INDICATION parameter that may be set based on the response type that the S1G STA expects to receive. The RXVECTOR sent to the MAC sublayer may have corresponding values in the RESPONSE_INDICATION parameter.

Figure 22:
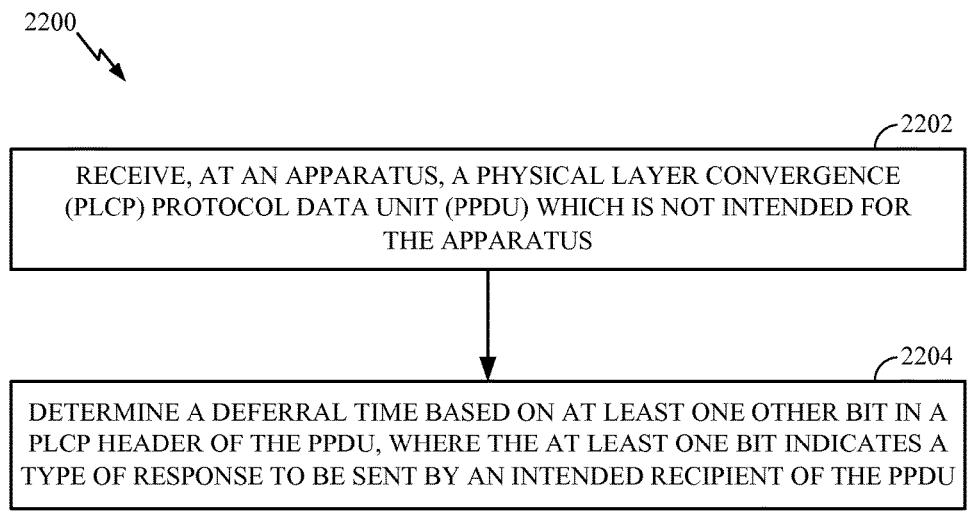
FIG. 22 is a flow diagram of example operations for wireless communications by a third party apparatus receiving a PPDU intended for a different apparatus, in accordance with certain aspects of the present disclosure.

FIG. 22 is a flow diagram of example operations 2200 for wireless communications, according to certain aspects of the present disclosure. The operations 2200 may be performed by a third party receiving apparatus (e.g., a STA which is not the intended recipient). The operations 2200 may begin, at 2202, with the apparatus receiving a PPDU which is not intended for the apparatus. At 2204, the apparatus may determine a deferral time (for accessing a wireless medium) based on at least one bit in a PLCP header of the PPDU, wherein the at least one bit indicates a type of response to be sent by an intended recipient of the PPDU.

According to certain aspects, the operations 2200 may further include the apparatus setting a Response Indication Deferral (RID) counter based on the determined deferral time. For certain aspects, the apparatus may determine a carrier sensing (CS) indication based, at least in part, on a value of the RID counter and a value of a network allocation vector (NAV) counter. For certain aspects, the RID counter is updated when a PHY-RXEND.indication primitive is issued for the received PPDU. For other aspects, the RID counter is updated at an instant of time a PHY-RXEND.indication primitive is expected to be issued for the received PPDU.

According to certain aspects, the at least one bit in the PLCP header includes at least two bits set to a value that indicates no response is to be sent, that an NDP response is to be sent, that a normal response is to be sent, or that a long response is to be sent. For certain aspects, the deferral time is determined to be 0 if the at least two bits indicate no response is to be sent. For other aspects, the deferral time is determined to include a maximum PPDU duration plus a short interframe space (SIFS) if the at least two bits indicate the long response is to be sent. For certain aspects, determining the deferral time at 2204 is further based on at least one of a preamble type, an aggregation bit in the PLCP header, a channel bandwidth, or a modulation and coding scheme (MCS). For certain aspects, the deferral time may be determined to include a normal transmit time plus a SIFS if the at least two bits indicate the normal response is to be sent. In this case, the normal transmit time may be calculated based on at least one of a preamble type, an aggregation bit in the PLCP header, a channel bandwidth, or an MCS. For certain aspects, determining the deferral time at 2204 is based on a preamble type if the at least two bits indicate the NDP response is to be sent. In this case, the deferral time may be determined to include an NDP transmit time plus a SIFS, where the NDP transmit time is equal to a time in microseconds for transmitting: (A) a 1 MHz NDP media access control (MAC) frame if the preamble type is a 1 MHz preamble; or (B) a >=2 MHz NDP MAC frame if the preamble type is a >=2 MHz short/long preamble.

According to certain aspects, the PPDU is a null data packet (NDP) media access control (MAC) frame. In this case, determining the deferral time at 2204 may be based on the at least one bit indicating the type of response and on a type of the NDP MAC frame.

Figure 7A:
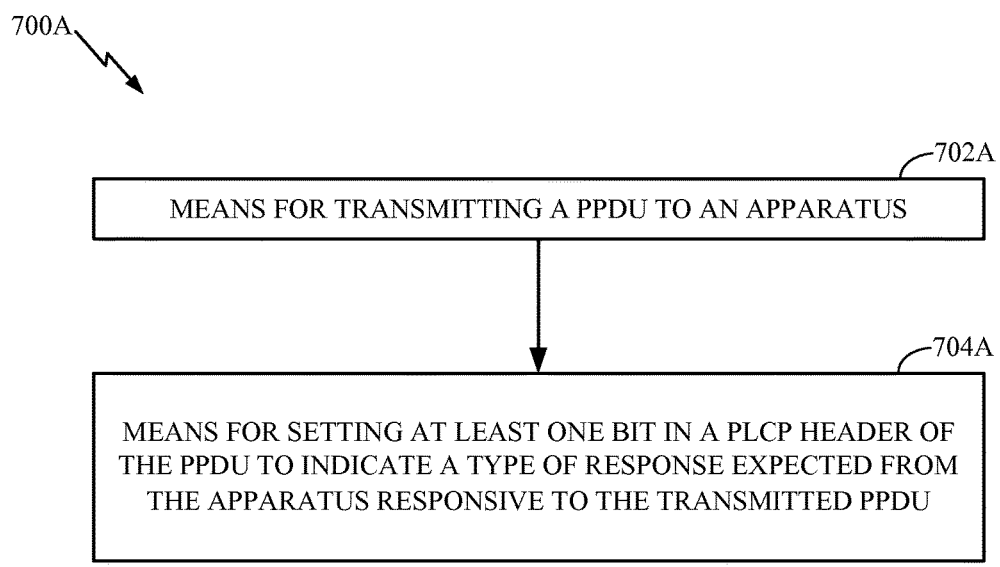
FIG. 7A illustrates example means capable of performing the operations shown in FIG. 7.
Figure 8A:
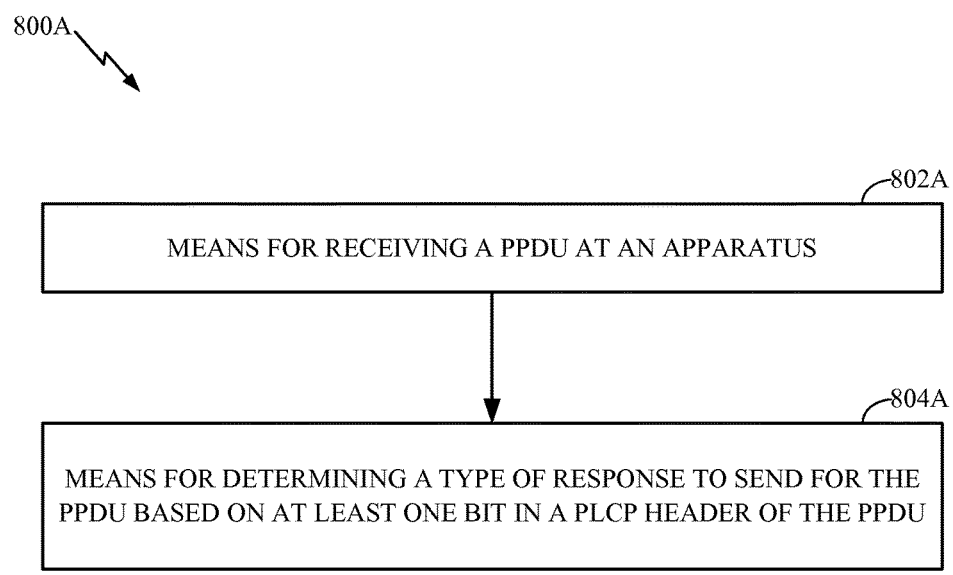
FIG. 8A illustrates example means capable of performing the operations shown in FIG. 8.
Figure 19A:
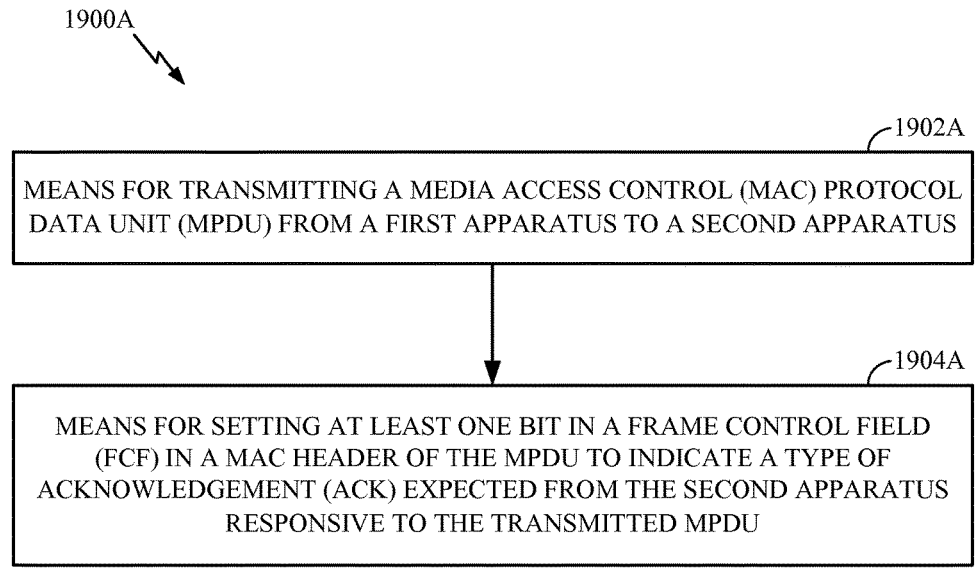
FIG. 19A illustrates example means capable of performing the operations shown in FIG. 19.
Figure 20A:
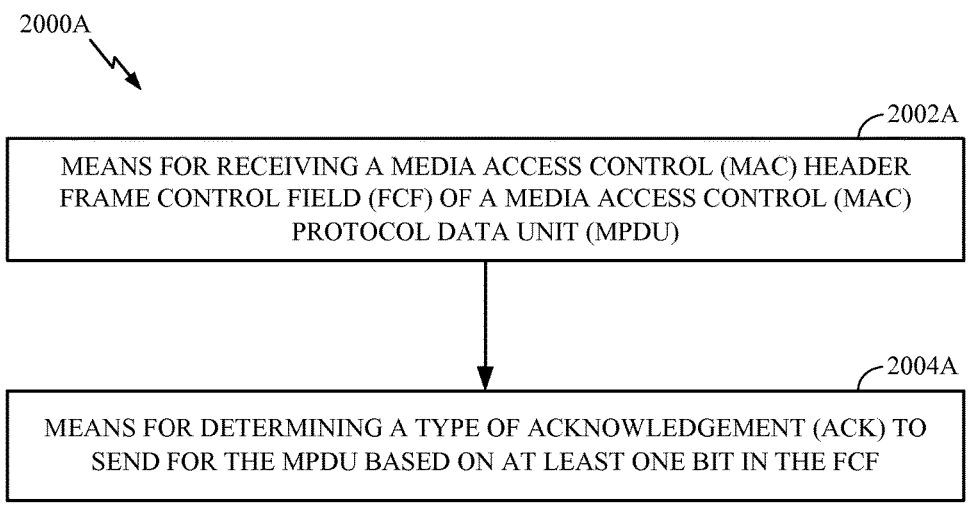
FIG. 20A illustrates example means capable of performing the operations shown in FIG. 20.
Figure 22A:
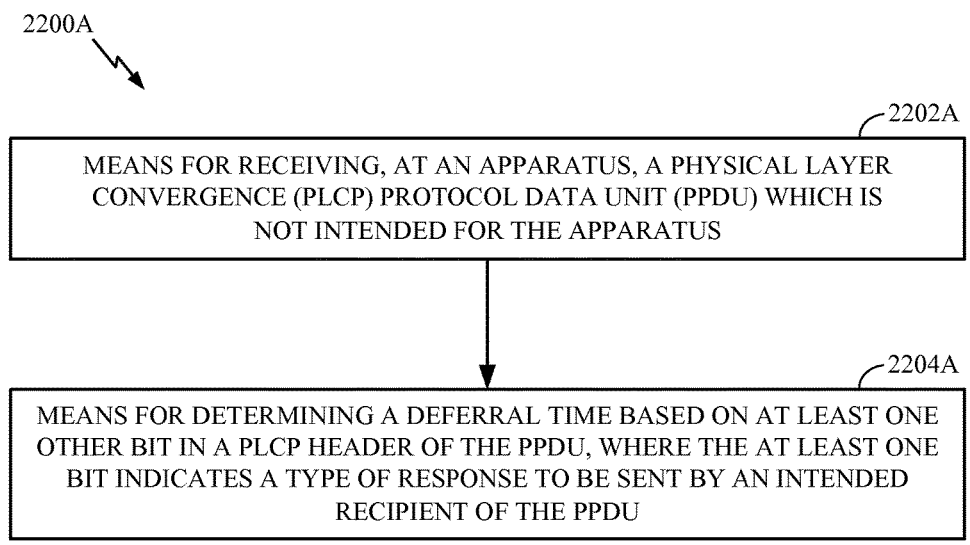
FIG. 22A illustrates example means capable of performing the operations shown in FIG. 22.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8 correspond to means 700A and 800A illustrated in FIGS. 7A and 8A, respectively. Similarly, operations 1900 and 2000 illustrated in FIGS. 19 and 20 correspond to means 1900A and 2000A illustrated in FIGS. 19A and 20A, respectively. Similarly, operations 2200 illustrated in FIG. 22 correspond to means 2200A illustrated in FIG. 22A.

For example, means for transmitting may comprise a transmitter (e.g., the transmitter unit 222) and/or the antenna(s) 224 of the access point 110 illustrated in FIG. 2, a transmitter (e.g., the transmitter unit 254) and/or the antenna(s) 252 of the user terminal 120 portrayed in FIG. 2, or the transmitter 310 and/or antenna(s) 316 depicted in FIG. 3. Means for receiving may comprise a receiver (e.g., the receiver unit 222) and/or the antenna(s) 224 of the access point 110 illustrated in FIG. 2, a receiver (e.g., the receiver unit 254) and/or the antenna(s) 252 of the user terminal 120 shown in FIG. 2, or the receiver 312 and/or antenna(s) 316 depicted in FIG. 3. Means for processing, means for setting, means for selecting, means for interpreting, means for including, means for (separately) indicating, means for encoding, means for providing, means for generating, and/or means for (separately) determining may comprise a processing system, which may include one or more processors, such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2 or the processor 304 and/or the DSP 320 portrayed in FIG. 3.

According to certain aspects, such means may be implemented by processing systems configured to perform the corresponding functions by implementing various algorithms (e.g., in hardware or by executing software instructions). For example, an algorithm for setting bits to indicate a type of response expected for a transmission (e.g., an MPDU or PPDU) may receive, as input, a type of transmission to send and conditional inputs that might factor in to a decision on what type of response is expected for that transmission. Based on this input, the algorithm may set the appropriate bits to indicate the expected type of response. Similarly, an algorithm for determining what type of response is expected, based on bits in a received transmission may receive (as input) the bits and decide, based on a value of the bits, what type of response is expected.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of a list of" items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
   a receiver configured to receive a physical layer convergence protocol (PLCP) protocol data unit (PPDU) which is not intended for the apparatus; and
   a processing system configured to:
      determine a deferral time based on at least two bits in a PLCP header of the PPDU, wherein the at least two bits indicate a type of response to be sent by an intended recipient of the PPDU, wherein the processing system is configured to determine the deferral time by determining:
  a first deferral time if the type of response is that a normal response is to be sent; and
  a second deferral time if the type of response is that a long response is to be sent; and
defer transmission of a signal based on the determined deferral time.

2. The apparatus of claim 1, wherein the processing system is further configured to set a Response Indication Deferral (RID) counter based on the determined deferral time.

3. The apparatus of claim 2, wherein the RID counter is updated at an instant of time a PHY-RXEND.indication primitive is expected to be issued for the received PPDU.

4. The apparatus of claim 1, wherein determining the deferral time further comprises:
  determining a third deferral time if the type of response is that no response is to be sent; and
  determining a fourth deferral time if the type of response is that a null data packet (NDP) response is to be sent.

5. The apparatus of claim 4, wherein:
  third deferral time is 0; and
  the second deferral time is a maximum PPDU duration plus a short interframe space (SIFS).

6. The apparatus of claim 4, wherein the first deferral time is a normal transmit time plus a short interframe space (SIFS) and wherein the normal transmit time is calculated based on at least one of a preamble type, an aggregation bit in the PLCP header, a channel bandwidth, or a modulation and coding scheme (MCS).

7. The apparatus of claim 4, wherein the processing system is configured to determine the fourth deferral time based on a preamble type.

8. The apparatus of claim 7, wherein the processing system is configured to determine the fourth deferral time to comprise an NDP transmit time plus a short interframe space (SIFS) and wherein the NDP transmit time is equal to a time in microseconds for transmitting:
  a 1 MHz NDP media access control (MAC) frame if the preamble type is a 1 MHz preamble; or
  a >=2 MHz NDP MAC frame if the preamble type is a >=2 MHz short/long preamble.

9. The apparatus of claim 1, wherein the processing system is further configured to determine the deferral time based on at least one of a preamble type, an aggregation bit in the PLCP header, a channel bandwidth, or a modulation and coding scheme (MCS).

10. The apparatus of claim 1, wherein the PPDU comprises a null data packet (NDP) media access control (MAC) frame and wherein the processing system is further configured to determine the deferral time based on a type of the NDP MAC frame.

11. A method for wireless communications by an apparatus, comprising:
  receiving a physical layer convergence protocol (PLCP) protocol data unit (PPDU) which is not intended for the apparatus;
  determining a deferral time based on at least two bits in a PLCP header of the PPDU, wherein the at least two bits indicate a type of response to be sent by an intended recipient of the PPDU, wherein determining the deferral time comprises determining:
    a first deferral time if the type of response is that a normal response is to be sent; and
    a second deferral time if the type of response is that a long response is to be sent; and
  deferring transmission of a signal based on the determined deferral time.

12. The method of claim 11, further comprising setting a Response Indication Deferral (RID) counter based on the determined deferral time.

13. The method of claim 12, wherein the RID counter is updated at an instant of time a PHY-RXEND.indication primitive is expected to be issued for the received PPDU.

14. The method of claim 11, wherein determining the deferral time further comprises:
  determining a third deferral time if the type of response is that no response is to be sent; and
  determining a fourth deferral time if the type of response is that a null data packet (NDP) response is to be sent.

15. The method of claim 14, wherein:
  the third deferral time is 0; and
  the second deferral time is a maximum PPDU duration plus a short interframe space (SIFS).

16. The method of claim 14, wherein the first deferral time is normal transmit time plus a short interframe space (SIFS) and wherein the normal transmit time is calculated based on at least one of a preamble type, an aggregation bit in the PLCP header, a channel bandwidth, or a modulation and coding scheme (MCS).

17. The method of claim 14, wherein determining the fourth deferral time is based on a preamble type.

18. The method of claim 17, wherein the fourth deferral time is determined to comprise an NDP transmit time plus a short interframe space (SIFS) and wherein the NDP transmit time is equal to a time in microseconds for transmitting:
  a 1 MHz NDP media access control (MAC) frame if the preamble type is a 1 MHz preamble; or
  a >=2 MHz NDP MAC frame if the preamble type is a >=2 MHz short/long preamble.

19. The method of claim 11, wherein determining the deferral time is further based on at least one of a preamble type, an aggregation bit in the PLCP header, a channel bandwidth, or a modulation and coding scheme (MCS).

20. The method of claim 11, wherein the PPDU comprises a null data packet (NDP) media access control (MAC) frame and wherein determining the deferral time is further based on a type of the NDP MAC frame.

21. An apparatus for wireless communications, comprising:
  means for receiving a physical layer convergence protocol (PLCP) protocol data unit (PPDU) which is not intended for the apparatus;
  means for determining a deferral time based on at least two bits in a PLCP header of the PPDU, wherein the at least two bits indicate a type of response to be sent by an intended recipient of the PPDU, wherein determining the deferral time comprises determining:
    a first deferral time if the type of response is that a normal response is to be sent; and
    a second deferral time if the type of response is that a long response is to be sent; and
  means for deferring transmission of a signal based on the determined deferral time.

22. The apparatus of claim 21, further comprising means for setting a Response Indication Deferral (RID) counter based on the determined deferral time.

23. The apparatus of claim 22, wherein the RID counter is updated at an instant of time a PHY-RXEND.indication primitive is expected to be issued for the received PPDU.

24. The apparatus of claim 21, wherein determining the deferral time further comprises:
   determining a third deferral time if the type of response is that no response is to be sent; and
   determining a fourth deferral time if the type of response is that a null data packet (NDP) response is to be sent.

25. The apparatus of claim 24, wherein:
   the first deferral time is 0; and
   the second deferral time is a maximum PPDU duration plus a short interframe space (SIFS).

26. The apparatus of claim 24, wherein the first deferral time is a normal transmit time plus a short interframe space (SIFS) and wherein the normal transmit time is calculated based on at least one of a preamble type, an aggregation bit in the PLCP header, a channel bandwidth, or a modulation and coding scheme (MCS).

27. The apparatus of claim 24, wherein the means for determining is configured to determine the fourth deferral time based on a preamble type if the at least two bits indicate the NDP response is to be sent.

28. The apparatus of claim 27, wherein the means for determining is configured to determine the fourth deferral time to comprise an NDP transmit time plus a short interframe space (SIFS) and wherein the NDP transmit time is equal to a time in microseconds for transmitting a 1 MHz NDP media access control (MAC) frame if the preamble type is a 1 MHz preamble or a >=2 MHz NDP MAC frame if the preamble type is a >=2 MHz short/long preamble.

29. The apparatus of claim 21, wherein the means for determining is further configured to determine the deferral time based on at least one of a preamble type, an aggregation bit in the PLCP header, a channel bandwidth, or a modulation and coding scheme (MCS).

30. The apparatus of claim 21, wherein the PPDU comprises a null data packet (NDP) media access control (MAC) frame and wherein the means for determining is further configured to determine the deferral time based on a type of the NDP MAC frame.

31. A non-transitory computer-readable medium having instructions executable to:
   receive a physical layer convergence protocol (PLCP) protocol data unit (PPDU) which is not intended for an apparatus;
   determine a deferral time based on at least two bits in a PLCP header of the PPDU, wherein the at least two bits indicate a type of response to be sent by an intended recipient of the PPDU, wherein determining the deferral time comprises determining:
      a first deferral time if the type of response is that a normal response is to be sent; and
      a second deferral time if the type of response is that a long response is to be sent; and
   defer transmission of a signal based on the determined deferral time.

32. A wireless station, comprising:
   at least one antenna;
   a receiver configured to receive, via the at least one antenna, a physical layer convergence protocol (PLCP) protocol data unit (PPDU) which is not intended for the wireless station; and
   a processing system configured to:
      determine a deferral time based on at least two bits in a PLCP header of the PPDU, wherein the at least two bits indicate a type of response to be sent by an intended recipient of the PPDU, wherein the processing system is configured to determine the deferral time by determining:
         a first deferral time if the type of response is that a normal response is to be sent; and
         a second deferral time if the type of response is that a long response is to be sent; and
      defer transmission of a signal based on the determined deferral time.

* * * * *